US012507305B2

(12) United States Patent
Zhang et al.

(10) Patent No.: US 12,507,305 B2
(45) Date of Patent: Dec. 23, 2025

(54) LINK FAILURE RECOVERY METHOD AND APPARATUS

(71) Applicant: HUAWEI TECHNOLOGIES CO., LTD., Guangdong (CN)

(72) Inventors: Di Zhang, Shenzhen (CN); Kunpeng Liu, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 539 days.

(21) Appl. No.: 17/586,198

(22) Filed: Jan. 27, 2022

(65) Prior Publication Data

US 2022/0151009 A1    May 12, 2022

Related U.S. Application Data

(63) Continuation of application No. PCT/CN2020/102315, filed on Jul. 16, 2020.

(30) Foreign Application Priority Data

Jul. 29, 2019 (CN) .......................... 201910690844.6

(51) Int. Cl.
*H04W 76/19* (2018.01)
*H04W 72/21* (2023.01)

(52) U.S. Cl.
CPC ........... *H04W 76/19* (2018.02); *H04W 72/21* (2023.01)

(58) Field of Classification Search
CPC .......................... H04W 76/19; H04W 72/1284
See application file for complete search history.

(56) References Cited

U.S. PATENT DOCUMENTS

| 11,705,956 B2 * | 7/2023 | Dong ..................... H04B 7/088 370/329 |
| 2011/0021154 A1 * | 1/2011 | Marinier ............... H04W 76/18 455/67.11 |
| 2014/0071868 A1 * | 3/2014 | Bergquist .............. H04L 1/1803 370/328 |

(Continued)

FOREIGN PATENT DOCUMENTS

| CN | 109245870 A | 1/2019 |
| CN | 109246743 A | 1/2019 |

(Continued)

OTHER PUBLICATIONS

Extended European Search Report issued in European Application No. 20847296.9 on Aug. 2, 2022, 19 pages.

(Continued)

*Primary Examiner* — Parth Patel
(74) *Attorney, Agent, or Firm* — Fish & Richardson P.C.

(57) ABSTRACT

This application provides example link failure recovery methods and apparatuses. One example method includes sending, by a terminal device, a first media access control-control element (MAC-CE) to a network device, where the first MAC-CE includes information about a cell in which the a first link failure occurs. The terminal device can then start a first timer. The terminal device can then send a first request message when the first timer expires, where the first request message is the first MAC-CE or a second MAC-CE including information about at least one cell in which a link failure occurs.

20 Claims, 12 Drawing Sheets

(56) References Cited

U.S. PATENT DOCUMENTS

| | | | | |
|---|---|---|---|---|
| 2015/0245407 | A1* | 8/2015 | Johansson | H04W 36/24 370/329 |
| 2016/0100429 | A1* | 4/2016 | Boström | H04W 24/10 370/329 |
| 2019/0037634 | A1* | 1/2019 | Kadiri | H04W 76/18 |
| 2019/0149421 | A1* | 5/2019 | Jin | H04W 36/144 370/331 |
| 2019/0215863 | A1* | 7/2019 | Kim | H04W 36/06 |
| 2019/0222404 | A1* | 7/2019 | Ang | H04L 5/0096 |
| 2019/0253949 | A1* | 8/2019 | Park | H04W 36/14 |
| 2019/0253986 | A1* | 8/2019 | Jeon | H04L 5/0048 |
| 2020/0037179 | A1* | 1/2020 | Dalsgaard | H04W 76/38 |
| 2020/0100179 | A1* | 3/2020 | Zhou | H04W 52/0216 |
| 2020/0127799 | A1* | 4/2020 | Orsino | H04L 25/0226 |
| 2020/0314942 | A1* | 10/2020 | Bai | H04W 76/15 |
| 2020/0328796 | A1* | 10/2020 | Turtinen | H04B 7/0695 |
| 2020/0374960 | A1* | 11/2020 | Deenoo | H04B 7/0695 |
| 2021/0068162 | A1* | 3/2021 | Agiwal | H04L 5/0023 |
| 2021/0168894 | A1* | 6/2021 | Sha | H04L 5/0053 |
| 2021/0195674 | A1* | 6/2021 | Park | H04W 76/18 |
| 2021/0195675 | A1* | 6/2021 | Park | H04W 76/19 |
| 2021/0204256 | A1* | 7/2021 | Xu | H04W 72/23 |
| 2021/0204345 | A1* | 7/2021 | Shi | H04W 76/15 |
| 2021/0315040 | A1* | 10/2021 | Wu | H04W 48/20 |
| 2022/0123823 | A1* | 4/2022 | Dong | H04W 76/19 |
| 2022/0150730 | A1* | 5/2022 | Freda | H04L 1/1812 |
| 2022/0151009 | A1* | 5/2022 | Zhang | H04L 1/188 |
| 2022/0183075 | A1* | 6/2022 | Jiang | H04W 74/008 |

FOREIGN PATENT DOCUMENTS

| | | |
|---|---|---|
| CN | 110034799 A | 7/2019 |
| CN | 110035502 A | 7/2019 |
| EP | 3716713 A1 | 9/2020 |
| EP | 3736999 A1 | 11/2020 |
| JP | 2019176284 A * | 10/2019 |
| WO | 2019029667 A1 | 2/2019 |
| WO | 2019135654 A1 | 7/2019 |
| WO | 2019137378 A1 | 7/2019 |
| WO | 2019137446 A1 | 7/2019 |
| WO | 2020010615 A1 | 1/2020 |

OTHER PUBLICATIONS

ASUSTek, "Remaining issues of SCell BFR," 3GPP TSG-RAN WG2 Meeting #108, R2-1916037, Reno, USA, Nov. 18-22, 2019, 4 pages.
Fujitsu, "Discussion on beam failure recovery procedure," 3GPP TSG RAN WG1 Meeting #88bis, R1-1704478, Spokane, USA, Apr. 3-7, 2017, 3 pages.
Office Action issued in Chinese Application No. 201910690844.6 on May 19, 2021, 14 pages (with English translation).
PCT International Search Report and Written Opinion issued in International Application No. PCT/CN2020/102315 on Sep. 24, 2020, 19 pages (with English translation).
Qualcomm, "Beam failure recovery procedure," 3GPP TSG-RAN WG1 #92b, R1-1804788, Sanya, China, Apr. 16-20, 2018, 10 pages.

* cited by examiner

LINK FAILURE RECOVERY METHOD AND APPARATUS

CROSS-REFERENCE TO RELATED APPLICATIONS

This application is a continuation of International Application No. PCT/CN2020/102315, filed on Jul. 16, 2020, which claims priority to Chinese Patent Application No. 201910690844.6, filed on Jul. 29, 2019. The disclosures of the aforementioned applications are hereby incorporated by reference in their entireties.

TECHNICAL FIELD

This application relates to the wireless communications field, and more specifically, to a link failure recovery method and apparatus.

BACKGROUND

Because of blocking in a communication process and a poor diffraction capability on a high frequency channel, a current serving beam is blocked, and signal transmission cannot proceed. To prevent a communications link from being suddenly interrupted when a beam is blocked, a corresponding mechanism needs to be introduced to detect beam quality and quickly recover the link when the beam is blocked.

When detecting a link failure, a terminal device sends information about a cell in which the link failure occurs to a network device. Specifically, the information about the cell in which the link failure occurs is carried on a media access control-control element (control element, media access control, MAC-CE).

However, when the information about the cell in which the link failure occurs needs to be retransmitted, retransmission of the information about the cell in which the link failure occurs is based on a MAC-CE retransmission mechanism, and MAC-CE retransmission depends on scheduling by the network device. As a result, quick link recovery of the cell in which the link failure occurs may not be ensured.

SUMMARY

This application provides a link failure recovery method and apparatus. After determining that a link failure occurs in a cell, and sending information about the cell in which the link failure occurs to a network device, a terminal device starts a first timer. When the first timer expires, the terminal device requests, from the network device, another resource for carrying the information about the cell in which the link failure occurs, or a resource for carrying new information about the cell in which the link failure occurs. In this way, a problem of a delay caused by retransmitting, completely based on a MAC-CE retransmission mechanism controlled by the network device, the information about the cell in which the link failure occurs can be avoided, and a limitation that information about a same cell is retransmitted on a resource of the same cell based on the retransmission mechanism controlled by the network device can be further avoided, thereby improving link failure recovery performance.

According to a first aspect, a link failure recovery method is provided, and is applied to a case in which a link failure occurs in a cell. The link failure recovery method may be performed by a terminal device, or may be performed by a chip or a circuit disposed in the terminal device. This is not limited in this application.

The link failure recovery method includes:

sending a first media access control-control element MAC-CE, where the first MAC-CE includes information about the cell in which the link failure occurs; starting a first timer; and sending a first request message when the first timer expires, where the first request message is the first MAC-CE, or the first request message is a second MAC-CE, and the second MAC-CE includes information about at least one cell in which a link failure occurs.

According to the link failure recovery method provided in this embodiment of this application, after determining that a link failure occurs in a cell, the terminal device may start the first timer after sending information about the cell in which the link failure occurs to the network device based on the first MAC-CE, and when the first timer expires, the terminal device resends the information about the cell in which the link failure occurs to the network device, or the terminal device sends information about at least one cell in which a link failure occurs to the network device, to avoid retransmitting, completely based on a MAC-CE retransmission mechanism, the information about the cell in which the link failure occurs, thereby improving link failure recovery performance.

It should be understood that, when a MAC-CE retransmission mechanism specified in a current protocol is applied to a scenario in which the information about the cell in which the link failure occurs is retransmitted, because MAC-CE retransmission is based on control of the network device, link failure recovery time is uncontrollable, and the link failure recovery time may be excessively long, resulting in a great loss of system performance.

It should be further understood that, the MAC-CE in this embodiment of this application may be replaced with uplink control information (UCI). For example, first UCI is sent, where the first UCI includes the information about the cell in which the link failure occurs. Specifically, when the information, included in the UCI, about the cell in which the link failure occurs needs to be retransmitted, a mechanism, provided in this embodiment of this application, for retransmitting the information, included in the MAC-CE, about the cell in which the link failure occurs may be used. This application is mainly described below by using an example in which the information about the cell in which the link failure occurs is carried in the MAC-CE. A case in which the information about the cell in which the link failure occurs is carried in the UCI is not described in detail.

It should be further understood that, the information about the at least one cell in which the link failure occurs may include the information, included in the first MAC-CE, about the cell in which the link failure occurs. For example, if the terminal device determines that a link failure occurs in a first cell, the first MAC-CE includes information about the first cell, and the information about the at least one cell in which the link failure occurs includes the information about the first cell.

Specifically, the information about the cell in which the link failure occurs includes an identifier of the cell, or the information about the cell in which the link failure occurs includes information about a reference signal resource, or the information about the cell in which the link failure occurs includes information about a reference signal resource and an identifier of the cell. The information about the reference signal resource is used for link recovery of the cell in which the link failure occurs, and the information about the reference signal resource includes an index of the reference signal resource and/or channel quality information (for example, RSRP, RSRQ, a CQI, or a SINR) of a reference signal corresponding to the reference signal resource.

It should be noted that, in embodiments of this application, the "identifier" may be replaced with the "index", and the "index" may be replaced with the "identifier". The reference signal in this application may be a channel state information reference signal (CSI-RS), a synchronization signal and physical broadcast channel block (synchronous signal/PBCH block, SSB), a tracking reference signal (TRS), or another reference signal. In this embodiment of this application, there is a correspondence between the reference signal resource and the reference signal, and the reference signal resource may be understood as the reference signal. Therefore, the information about the reference signal resource may be the channel quality information of the reference signal corresponding to the reference signal resource (or referred to as channel quality information of the reference signal on the reference signal resource) and/or the index of the reference signal resource.

It should be further understood that, the "channel quality information" or "channel quality" in this application may be at least one of reference signal received power (L1-reference signal received power, L1-RSRP), a signal to interference plus noise ratio (L1-signal to interference plus noise ratio, L1-SINR) of the reference signal, the signal to interference plus noise ratio (SINR) of the reference signal, the channel quality indicator (channel quality indication. CQI) of the reference signal, or other channel quality information of the reference signal.

Based on a difference between information about cells in which a link failure occurs, the first MAC-CE and the second MAC-CE may have the following differences:

(1) A quantity of identifiers of cells that are included in the first MAC-CE is different from a quantity of identifiers of cells that are included in the second MAC-CE. For example, the first MAC-CE includes an identifier of the first cell, and the second MAC-CE includes the identifier of the first cell and an identifier of another cell in which a link failure occurs. That is, the second MAC-CE may include identifiers of a plurality of cells in which a link failure occurs. In this way, the network device learns, based on the second MAC-CE, that the link failure occurs in the plurality of cells.

(2) A quantity of information about reference signal resources that is included in the first MAC-CE is different from a quantity of information about reference signal resources that is included in the second MAC-CE. For example, the first MAC-CE includes information about a reference signal resource corresponding to the first cell, and the second MAC-CE includes the information about the reference signal resource corresponding to the first cell and information about a reference signal resource corresponding to another cell in which a link failure occurs. That is, the second MAC-CE may include information about reference signal resources corresponding to a plurality of cells in which a link failure occurs. In this way, the network device learns, based on the second MAC-CE, of reference signals used for link recovery of the plurality of cells in which the link failure occurs.

(3) Information about a reference signal resource that is included in the first MAC-CE is different from information about a reference signal resource that is included in the second MAC-CE. For example, the first MAC-CE includes information about a reference signal resource corresponding to the first cell, and the second MAC-CE includes information about a second reference signal resource corresponding to the first cell. That is, the second MAC-CE may include information about another reference signal resource corresponding to the first cell. In this way, a case in which link recovery of a cell in which a link failure occurs fails due to a problem of a reference signal resource is avoided.

It should be understood that, the first MAC-CE in this embodiment of this application may be understood as a link failure recovery request (beam failure recovery request, BFRQ) message, and is used to request link recovery of the cell in which the link failure occurs.

In a possible implementation, the terminal device reports the BFRQ message in one step. For example, the BFRQ message may be carried on a physical uplink shared channel (PUSCH) resource, or the BFRQ message may be carried on a PUCCH resource. In this implementation, the first MAC-CE is the BFRQ message.

In another possible implementation, the terminal device may alternatively report the BFRQ message in two steps by using a BFRQ 1 message and a BFRQ 2 message. The BFRQ 1 may be carried on a PUCCH resource or a PRACH resource, and the BFRQ 2 may be carried on a PUSCH resource or a PUCCH resource. In this implementation, the first MAC-CE is the BFRQ 2 message.

With reference to the first aspect, in some implementations of the first aspect, the method further includes: sending the first MAC-CE on a first resource; and sending the first request message on a second resource, where cells in which the first resource and the second resource are located are different.

Based on the foregoing technical solution, when the terminal device sends the first MAC-CE on the first resource and sends the first request message on the second resource, and the cells in which the first resource and the second resource are located are different, a case in which the terminal device fails to resend the MAC-CE on the first resource due to a quality problem of the first resource can be avoided, or a case in which the terminal device fails to resend the MAC-CE in the cell to which the first resource belongs due to a quality problem or a link problem of the cell in which the first resource is located can be avoided.

It should be understood that, when the MAC-CE retransmission mechanism specified in the current protocol is applied to the scenario in which the information about the cell in which the link failure occurs is retransmitted, retransmission of the information about the cell in which the link failure occurs can be performed only on a resource of a same cell for initial transmission. When a link of the cell to which the resource used to transmit the information about the cell in which the link failure occurs belongs has a problem or has poor channel quality, a failure of a plurality of MAC-CE retransmissions is still caused, resulting in a problem that a link recovery failure is caused for the cell in which the link failure occurs.

It should be further understood that, this embodiment of this application does not limit that the first MAC-CE and the first request message are necessarily transmitted on resources of different cells, and the first MAC-CE and the first request message may be transmitted on a resource of a same cell. For example, the cell in which the first resource for transmitting the first MAC-CE is located may also be used to transmit the first request message. Optionally, in this case, because the information about the reference signal resource that is carried on the first MAC-CE cannot be used for link recovery of the cell in which the link failure occurs, the terminal device may not receive a response message of the first MAC-CE within a running period of the first timer. The terminal device needs to report information about another reference signal resource for link recovery of the cell in which the link failure occurs.

It should be further understood that, that the terminal device can send the first MAC-CE on the first resource may be that the terminal device receives, before sending the first MAC-CE, second downlink control information (DCI) sent by the network device, and the terminal device learns, based on the second DCI, of the first resource for sending the first MAC-CE. Similarly, that the terminal device can send the first request message on the second resource may be that the terminal device receives, before sending the first request message, third DCI sent by the network device, where the third DCI indicates that the second resource is used to transmit the first request message.

Optionally, the first resource is a PUSCH resource, or the first resource is a PUCCH resource.

Optionally, the second resource is a PUSCH resource, or the second resource is a PUCCH resource.

It should be understood that, when the MAC-CE in this embodiment of this application is replaced with UCI, the first resource may be a PUSCH or a PUCCH, and the second resource may be a PUSCH or a PUCCH. If the MAC-CE is transmitted, the first resource and the second resource may be PUSCHs.

With reference to the first aspect, in some implementations of the first aspect, the method further includes: detecting first DCI and/or a first response message within a running period of the first timer, where the first DCI is used to indicate to resend the first MAC-CE, and the first response message is used to indicate that the first MAC-CE is successfully transmitted.

Based on the foregoing technical solution, the terminal device may detect, within the running period of the first timer, whether the network device delivers the first DCI used to indicate to resend the first MAC-CE (or referred to as first DCI indicating to retransmit the first MAC-CE); or the terminal device may detect, within the running period of the first timer, whether the network device delivers the first response message of the first MAC-CE; or the terminal device may detect, within the running period of the first timer, whether the network device delivers the first DCI used to indicate to resend the first MAC-CE and the first response message of the first MAC-CE. In this way, the terminal device may perform a subsequent procedure based on scheduling by the network device, and the network device is limited to completing, within preset time, transmission of the information about the cell in which the link failure occurs, so that the network device is prevented from belatedly indicating the resource for retransmitting the information about the cell in which the link failure occurs or belatedly sending the first response information of the first MAC-CE, and the link recovery of the cell in which the link failure occurs can be performed quickly.

It should be understood that, the first DCI used to indicate to resend the first MAC-CE and the second DCI for indicating the first resource have a same hybrid automatic repeat request (HARQ) process identifier, and the first DCI and the second DCI have a same new data indicator (NDI).

With reference to the first aspect, in some implementations of the first aspect, the method further includes: resending the first MAC-CE when the first DCI is received within the running period of the first timer.

According to the link failure recovery method provided in this embodiment of this application, when the terminal device receives the first DCI within the running period of the first timer, the terminal device may resend the first MAC-CE to the network device, so that the terminal device may resend the first MAC-CE based on the indication of the network device.

With reference to the first aspect, in some implementations of the first aspect, the method further includes: resetting the first timer K time units after the first MAC-CE is resent, where K is a value greater than or equal to 0.

According to the link failure recovery method provided in this embodiment of this application, after resending the first MAC-CE, or when resending the first MAC-CE, the terminal device may reset the first timer, so that the first timer works again. In this way, a failure of current retransmission of the first MAC-CE can be avoided, a moment for retransmitting the first MAC-CE again may be further determined depending on whether the first timer expires, and retransmission time of the first MAC-CE may be limited, so that the network device is prevented from belatedly indicating the resource for retransmitting the first MAC-CE, and the link recovery of the cell in which the link failure occurs can be performed quickly.

It should be understood that an action performed by the terminal device when the first timer expires or within a running period of the first timer after the first timer is reset is similar to an action performed by the terminal device when the first timer expires or within the running period of the first timer after the terminal device starts the first timer for the first time. Details are not described herein.

With reference to the first aspect, in some implementations of the first aspect, the method further includes: stopping the first timer when the first response message is received within the running period of the first timer.

According to the link failure recovery method provided in this embodiment of this application, when the terminal device receives, within the running period of the first timer, the first response message used to indicate that the first MAC-CE is successfully transmitted, the terminal device can learn that the first MAC-CE is successfully transmitted and the first MAC-CE does not need to be retransmitted, and the terminal device may stop the first timer, so that the terminal device may determine a subsequent procedure based on a feedback of the network device.

With reference to the first aspect, in some implementations of the first aspect, the response message may be any one of the following signaling: fourth DCI, a physical downlink control channel (PDCCH) transmission configuration indicator (TCI) of the cell in which the link failure occurs, DCI in a dedicated search space set, DCI in a dedicated control resource set, or DCI scrambled by using a dedicated radio network temporary identifier RNTI, where the fourth DCI is used to indicate a downlink resource, or the fourth DCI and the second DCI have a same hybrid automatic repeat request process identifier HARQ process identifier and different NDIs.

According to the link failure recovery method provided in this embodiment of this application, the terminal device may learn, by receiving any one or more of the foregoing signaling, that the first MAC-CE is successfully transmitted, that is, the first response message of the first MAC-CE has a plurality of specific forms. This is not limited in this application, and a flexible selection solution is provided.

It should be understood that, a cyclic redundancy check (CRC) of the DCI in the dedicated control resource set and/or the dedicated search space set may be scrambled by using a cell radio network temporary identifier (C-RNTI) or a modulation and coding scheme cell radio network temporary identifier (modulation coding mode cell radio network temporary identifier, MCS-C-RNTI).

With reference to the first aspect, in some implementations of the first aspect, before the sending a first request message, the method further includes: sending a second request message when the first timer expires, where the second request message is used to indicate the link failure.

According to the link failure recovery method provided in this embodiment of this application, when the first timer expires, the terminal device may further send the second request message used to indicate a link failure event. In this way, according to the link failure recovery method provided in this application, the network device may be notified in time that the link failure event occurs in a cell, and the network device may allocate, in time, a new resource used to carry information about the cell in which the link failure occurs, to perform timely link recovery of the cell in which the link failure occurs.

In a possible implementation, if the terminal device reports the BFRQ message in a one-step reporting form before starting the first timer, the sending a second request message when the first timer expires is sending the second request message for the first time. This may be understood as that a form of reporting the BFRQ message by the terminal device changes from the one-step reporting form to a two-step reporting form.

In another possible implementation, if the terminal device reports the BFRQ message in a two-step reporting form before starting the timer, before the sending a first MAC-CE, the method further includes: sending the second request message. That is, the sending a second request message when the first timer expires may be resending the second request message.

With reference to the first aspect, in some implementations of the first aspect, the second request message is carried on a physical uplink control channel (PUCCH), or the second request message is carried on a physical random access channel (PRACH). The PUCCH resource or the PRACH resource may be a resource of a primary cell (PCell) or a resource of a primary secondary cell (PSCell).

According to the link failure recovery method provided in this embodiment of this application, a resource used by the terminal device to transmit the second request message may be a physical uplink control channel (PUCCH) or a physical random access channel (PRACH), so that the network device may be notified in time that the link failure event occurs in a cell or a new resource is requested for transmitting information about the cell in which the link failure occurs. It should be understood that the second request message transmitted on the PUCCH may have a same format as a scheduling request (SR), or may be a scheduling request, or may be 1-bit information.

With reference to the first aspect, in some implementations of the first aspect, the starting a first timer includes: starting the first timer K time units after the first MAC-CE is sent, where K is a value greater than or equal to 0.

According to the link failure recovery method provided in this embodiment of this application, an occasion on which the terminal device starts the first timer may be after time at which the first MAC-CE is sent, or may be time at which the first MAC-CE is sent, to provide a flexible solution of determining time at which the first timer is started.

It should be understood that, in this embodiment of this application, a specific moment at which the first timer is started is not necessarily limited to being a moment the K time units after the first MAC-CE is sent, or may be a moment K time units before the first MAC-CE is sent. For example, when the terminal device reports the link failure request message in two steps, the terminal device may start the first timer after sending link failure event indication information (the second request message, the PUCCH) but before sending the first MAC-CE. Alternatively, a moment at which the first timer is started may be a moment at which the link failure is determined, or a moment after the link failure is determined and before the first MAC-CE is sent (or may be a moment before the second request message is sent).

With reference to the first aspect, in some implementations of the first aspect, the method further includes: starting a second timer; and when the second timer expires, sending, on a physical random access channel (PRACH), a third request message used for link failure recovery.

According to the link failure recovery method provided in this embodiment of this application, in addition to the first timer, the second timer may be further started. Specifically, when the second timer expires, the terminal device may send, on the PRACH, the third request message used for link failure recovery, so that when the terminal device cannot recover, on an existing resource or in an existing cell, the cell in which the link failure occurs, the terminal device initiates the PRACH in time, and continues to perform link recovery.

It should be understood that, the second timer may be used to control time of an entire link failure recovery procedure.

It should be further understood that, a reason why the link recovery of the cell in which the link failure occurs still fails within a running period of the second timer may be that a link failure also occurs on a link of the primary cell, and the terminal device cannot successfully send, on an existing uplink resource, the information about the cell in which the link failure occurs. Therefore, when the second timer expires, the terminal device may initiate a RACH procedure to recover the link of the primary cell.

It should be further understood that, an occasion on which the terminal device starts the second timer may be after time at which the first MAC-CE is sent, or may be time at which the first MAC-CE is sent, or may be after time at which the second request message is sent, or may be time at which the second request message is sent, or may be after time at which the link failure is determined, or may be time at which the link failure is determined. A specific moment at which the second timer is started is not limited in this application.

It should be further understood that, the third request message may include one or more of the following possibilities:

The third request message is used to indicate the link failure, or the third request information is used to request the link recovery of the cell in which the link failure occurs, or the third request information is used to request a resource used to carry the link failure recovery request message, or the like, or the third request message is used to initiate a random access procedure.

The PRACH may be a resource used for link failure recovery of the primary cell. The PRACH may alternatively be a resource used for link failure recovery of a cell in which the resource for carrying the second request message is located. The PRACH may be a contention-based resource (contention PRACH), or may be a non-contention-based resource (contention free PRACH).

In a possible implementation, timing duration of the second timer is longer than timing duration of the first timer.

For example, the first timer and the second timer are started at a moment P, the timing duration of the first timer is L1, the timing duration of the second timer is L2, and L2 is greater than L1.

For another example, the first timer is started at a moment P1, the second timer is started at a moment P2, the timing duration of the first timer is L1, the timing duration of the second timer is L2, and L2 is greater than L1.

For another example, the first timer is started at a moment P1, the second timer is started at a moment P2, the timing duration of the first timer is L1, the timing duration of the second timer is L2, L2 is greater than L1, and P1+L1 is less than or equal to P2+L2.

In another possible implementation, after the first timer and the second timer are started for the first time, a moment at which the second timer expires is later than or equal to a moment at which the first timer expires.

With reference to the first aspect, in some implementations of the first aspect, the method further includes: stopping the second timer when a second response message is received within a running period of the second timer, where the second response message is used to indicate that the information about the cell in which the link failure occurs is successfully transmitted.

According to the link failure recovery method provided in this embodiment of this application, within the running period of the second timer, if the terminal device receives the second response message indicating that the information about the cell in which the link failure occurs is successfully transmitted, the terminal device can determine that the information about the cell in which the link failure occurs is successfully transmitted to the network device, and the terminal device may stop the second timer.

With reference to the first aspect, in some implementations of the first aspect, the information about the cell in which the link failure occurs includes: identification information of the cell in which the link failure occurs and/or information about a reference signal resource, where the information about the reference signal resource is used for link recovery of the cell in which the link failure occurs.

According to the link failure recovery method provided in this embodiment of this application, the information about the cell in which the link failure occurs may be at least one of the identification information of the cell in which the link failure occurs and the information about the reference signal resource, so that the network device may learn of the information about the cell in which the link failure occurs, and perform, based on the information, timely link recovery of the cell in which the link failure occurs.

According to a second aspect, a link failure recovery method is provided, and is applied to a case in which a link failure occurs in a cell. The link failure recovery method may be performed by a network device, or may be performed by a chip or a circuit disposed in the network device. This is not limited in this application.

The link failure recovery method includes:
sending second control information DCI, where the second DCI indicates a first resource; detecting a first media access control-control element MAC-CE on the first resource, where the first MAC-CE includes information about the cell in which the link failure occurs; starting a first timer; and determining, depending on whether the first MAC-CE is received within a running period of the first timer, to send first DCI or a first response message, where the first DCI is used to indicate to resend the first MAC-CE, and the first response message is used to indicate that the first MAC-CE is successfully transmitted.

According to the link failure recovery method provided in this embodiment of this application, the network device starts the first timer after sending the second DCI, detects, within the running period of the first timer on the first resource indicated by the second DCI, the first MAC-CE sent by a terminal device, and determines a subsequent execution procedure depending on whether the first MAC-CE sent by the terminal device is received. That is, after the first timer is introduced, the network device may perform a scheduling solution based on the first timer. In this way, a problem of an excessively long delay caused by retransmitting, completely based on an indication of a MAC-CE retransmission mechanism, the information about the cell in which the link failure occurs can be avoided, the network device is prevented from belatedly indicating a resource for retransmitting the information about the cell in which the link failure occurs or belatedly sending the first response information of the first MAC-CE, and link recovery of the cell in which the link failure occurs can be performed quickly, thereby improving link failure recovery performance.

With reference to the second aspect, in some implementations of the second aspect, the method further includes: when the first MAC-CE is not received within the running period of the first timer, sending the first DCI, and re-detecting the first MAC-CE.

According to the link failure recovery method provided in this embodiment of this application, when the network device does not receive the first MAC-CE within the running period of the first timer, the network device may send the first DCI used to indicate to retransmit the first MAC-CE, so that the network device can indicate, in time, a resource used by the terminal device to retransmit the first MAC-CE.

With reference to the second aspect, in some implementations of the second aspect, the method further includes: resetting the first timer K time units after the first MAC-CE is re-detected, where K is a value greater than or equal to 0.

According to the link failure recovery method provided in this embodiment of this application, after re-detecting the first MAC-CE, or when re-detecting the first MAC-CE, the network device may reset the first timer, so that the first timer works again. In this way, a problem of an excessively long delay of retransmitting the first MAC-CE can be avoided, and time of retransmitting the MAC-CE used to indicate the information about the cell in which the link failure occurs is controlled.

With reference to the second aspect, in some implementations of the second aspect, the method further includes: sending the first response message when the first MAC-CE is received within the running period of the first timer; or stopping the first timer when a hybrid automatic repeat request-acknowledgement (HARQ-ACK) of the first response message is received.

According to the link failure recovery method provided in this embodiment of this application, when the network device receives the first MAC-CE within the running period of the first timer, the network device sends, to the terminal device, the first response message used to indicate that the first MAC-CE is successfully transmitted; or when the network device receives the hybrid automatic repeat request-acknowledgement (HARQ-ACK) of the first response message that is fed back by the terminal device and that indicates that the first MAC-CE is successfully received, the network device may stop the first timer, to provide a flexible optional solution for the network device to learn of a moment of stopping the first timer, stop a link failure recovery procedure in time, and perform normal signal transmission in a cell for which a link has been recovered.

With reference to the second aspect, in some implementations of the second aspect, the first response message may be any one of the following signaling: fourth DCI, a physical downlink control channel (PDCCH) transmission configuration indicator (TCI) of the cell in which the link failure occurs, DCI in a dedicated search space set, DCI in a dedicated control resource set, or DCI scrambled by using a dedicated radio network temporary identifier RNTI, where the fourth DCI is used to indicate a downlink resource, or the fourth DCI and the second DCI have a same hybrid automatic repeat request process identifier HARQ process identifier and different new data indicators NDIs.

According to the link failure recovery method provided in this embodiment of this application, the network device may notify, by delivering one or more of the foregoing signaling, the terminal device that the first MAC-CE is successfully transmitted, that is, the first response message of the first MAC-CE has a plurality of specific forms. This is not limited in this application, and a flexible selection solution is provided.

With reference to the second aspect, in some implementations of the second aspect, the method further includes: sending third DCI when the first timer expires, where the third DCI is used to indicate a second resource for carrying a first request message, the first request message is the first MAC-CE, or the first request message is a second MAC-CE, and the second MAC-CE includes information about at least one of cell in which a link failure occurs.

According to the link failure recovery method provided in this embodiment of this application, when the first timer expires, the network device may restart a HARQ procedure, and may indicate, to the terminal device, the second resource of a new cell that is used to transmit the first request message, so that the terminal device may transmit a link failure recovery request message on resources of different cells, thereby increasing a link failure recovery probability. Alternatively, when the first timer expires, the network device may restart a HARQ procedure, so that the terminal device may update the information about the cell in which the link failure occurs, for example, update information about a reference signal resource used for the link recovery of the cell in which the link failure occurs, and the network device may perform, based on information about the new reference signal resource, the link recovery of the cell in which the link failure occurs, thereby increasing a link failure recovery probability.

With reference to the first aspect, in some implementations of the first aspect, the method further includes: cells in which the first resource and the second resource are located are different.

According to the link failure recovery method provided in this embodiment of this application, when the first timer expires, the network device may indicate, to the terminal device, the second resource used to transmit the first request message, so that the terminal device may transmit the link failure recovery request message on different resources. When the first MAC-CE cannot be detected on the first resource, the network device may indicate the second resource that is in the cell different from the cell in which the first resource is located. In this way, a case in which the network device cannot detect the first MAC-CE in the cell to which the first resource belongs due to a quality problem/link problem of the cell in which the first resource is located can be avoided.

With reference to the second aspect, in some implementations of the second aspect, before the sending third DCI, the method further includes: receiving a second request message, where the second request message is used to indicate the link failure; and sending the third DCI based on the second request message.

According to the link failure recovery method provided in this embodiment of this application, the network device may indicate, to the terminal device based on the second request message that is sent by the terminal device and that indicates that the link failure event occurs, the second resource for transmitting the first request message, to provide a possible solution for the network device to determine to send the third DCL.

With reference to the second aspect, in some implementations of the second aspect, the second request message is carried on a physical uplink control channel (PUCCH), or the second request message is carried on a physical random access channel (PRACH). The PUCCH resource or the PRACH resource may be a resource of a PCell or a resource of a PSCell.

According to the link failure recovery method provided in this embodiment of this application, the resource used by the terminal device to transmit the second request message may be the PUCCH or the PRACH, so that the network device learns in time that a link failure event occurs in a cell, and the network device may allocate, in time, a resource used to carry information about the cell in which the link failure occurs, to perform timely link recovery of the cell in which the link failure occurs.

With reference to the second aspect, in some implementations of the second aspect, the starting a first timer includes: starting the first timer K time units after the first MAC-CE is detected, where K is a value greater than or equal to 0.

According to the link failure recovery method provided in this embodiment of this application, an occasion on which the network device starts the first timer may be after time at which the first MAC-CE starts to be detected, or may be time at which the first MAC-CE starts to be detected, to provide a flexible solution of determining time at which the first timer is started.

It should be understood that, in this embodiment of this application, a specific moment at which the first timer is started is not necessarily limited to being a moment the K time units after the first MAC-CE starts to be detected, or may be a moment K time units before the first MAC-CE starts to be detected. For example, when the terminal device reports the link failure request message in two steps, the network device may start the first MAC-CE after receiving link failure event indication information (the second request message, the PUCCH) but before starting to detect the first MAC-CE. Alternatively, a moment at which the first timer is started may be a moment at which the link failure is determined, or a moment after the link failure is determined and before the first MAC-CE is sent (or may be a moment before the second request message is sent).

It should be further understood that, the network device may alternatively start the first timer K time units after the second DCI is sent.

With reference to the second aspect, in some implementations of the second aspect, the information about the cell in which the link failure occurs includes: identification information of the cell in which the link failure occurs and/or information about a reference signal resource, where the information about the reference signal resource is used for link recovery of the cell in which the link failure occurs.

According to the link failure recovery method provided in this embodiment of this application, the information about the cell in which the link failure occurs may be at least one of the identification information of the cell in which the link failure occurs and the information about the reference signal resource, to provide a flexible selection for the network device to learn of the cell in which the link failure occurs.

According to a third aspect, a link failure recovery method is provided, and is applied to a case in which a link failure occurs in a cell. The link failure recovery method may be performed by a terminal device, or may be performed by a chip or a circuit disposed in the terminal device. This is not limited in this application.

The link failure recovery method includes:
sending a first media access control-control element MAC-CE, where the first MAC-CE includes information about the cell in which the link failure occurs; starting a second timer; and when the second timer expires, sending, on a physical random access channel (PRACH), a third request message used for link failure recovery.

According to the link failure recovery method provided in this embodiment of this application, the terminal device determines that a link failure occurs in a cell, sends, to a network device based on the first MAC-CE, information about the cell in which the link failure occurs, and starts the second timer, and when the second timer expires, the terminal device sends, to the network device on the PRACH, the third request message used for link failure recovery, so that when the terminal device cannot recover, on an existing resource or in an existing cell, the cell in which the link failure occurs, the terminal device initiates a PRACH in time, and continues to perform link recovery.

It should be understood that, the second timer may be used to control time of an entire link failure recovery procedure.

It should be further understood that, a reason why the link recovery of the cell in which the link failure occurs still fails within a running period of the second timer may be that a link failure also occurs on a link of a primary cell, and the terminal device cannot successfully send, on an existing uplink resource, the information about the cell in which the link failure occurs. Therefore, when the second timer expires, the terminal device may initiate a RACH procedure to recover the link of the primary cell.

With reference to the third aspect, in some implementations of the third aspect, the method further includes: stopping the second timer when a second response message is received within a running period of the second timer, where the second response message is used to indicate that the information about the cell in which the link failure occurs is successfully transmitted.

According to the link failure recovery method provided in this embodiment of this application, within the running period of the second timer, if the terminal device receives the second response message indicating that the information about the cell in which the link failure occurs is successfully transmitted, the terminal device can determine that the information about the cell in which the link failure occurs is successfully transmitted to the network device, and the terminal device may stop the second timer.

With reference to the third aspect, in some implementations of the third aspect, the starting a second timer includes: starting the second timer X time units after the first MAC-CE is sent; or when the second request message is sent before the first MAC-CE is sent, starting the second timer X time units after the second request message is sent, where X is a value greater than or equal to 0, and the second request message is used to indicate the link failure. Alternatively, the second timer is started after the link failure is determined.

According to the link failure recovery method provided in this embodiment of this application, an occasion on which the terminal device starts the second timer may be after time at which the first MAC-CE is sent, or may be time at which the first MAC-CE is sent, or may be after time at which the second request message is sent, or may be time at which the second request message is sent, or may be after time at which the link failure is determined, or may be time at which the link failure is determined. A specific moment at which the second timer is started is not limited in this application.

With reference to the third aspect, in some implementations of the third aspect, the method further includes: starting a first timer; and sending a first request message when the first timer expires, where the first request message is the first MAC-CE, or the first request message is a second MAC-CE, and the second MAC-CE includes information about at least one cell in which a link failure occurs.

According to the link failure recovery method provided in this embodiment of this application, after determining that a link failure occurs in a cell, the terminal device may start the first timer after sending information about the cell in which the link failure occurs to the network device based on the first MAC-CE, and when the first timer expires, the terminal device resends the information about the cell in which the link failure occurs to the network device, or the terminal device sends information about at least one cell in which a link failure occurs to the network device, to avoid a problem of an excessively long delay caused by retransmitting, completely based on a MAC-CE retransmission mechanism, the information about the cell in which the link failure occurs, thereby improving link failure recovery performance.

With reference to the third aspect, in some implementations of the third aspect, the starting a first timer includes: starting the first timer K time units after the first MAC-CE is sent, where K is a value greater than or equal to 0.

According to the link failure recovery method provided in this embodiment of this application, an occasion on which the terminal device starts the first timer may be after time at which the first MAC-CE is sent, or may be time at which the first MAC-CE is sent, to provide a flexible solution of determining time at which the first timer is started.

It should be understood that, in this embodiment of this application, a specific moment at which the first timer is started is not necessarily limited to being a moment the K time units after the first MAC-CE is sent, or may be a moment K time units before the first MAC-CE is sent. For example, when the terminal device reports a link failure request message in two steps, the terminal device may start the first timer after sending link failure event indication information (the second request message, a PUCCH) but before sending the first MAC-CE.

With reference to the third aspect, in some implementations of the third aspect, the method further includes: detecting first DCI and/or a first response message within a running period of the first timer, where the first DCI is used to indicate to resend the first MAC-CE (which is also referred to as that the first DCI is used to indicate a resource for retransmitting the first MAC-CE), and the first response message is used to indicate that the first MAC-CE is successfully transmitted.

Based on the foregoing technical solution, the terminal device may detect, within the running period of the first timer, whether the network device delivers the first DCI used to indicate to resend the first MAC-CE; or the terminal device may detect, within the running period of the first timer, whether the network device delivers the first response message of the first MAC-CE; or the terminal device may detect, within the running period of the first timer, whether the network device delivers the first DCI used to indicate to resend the first MAC-CE and the first response message of the first MAC-CE. In this way, the terminal device may perform a subsequent procedure based on scheduling by the network device, and the network device is limited to completing, within preset time, transmission of the information about the cell in which the link failure occurs, so that the network device is prevented from belatedly indicating the resource for retransmitting the information about the cell in which the link failure occurs or belatedly sending the first response information of the first MAC-CE, and the link recovery of the cell in which the link failure occurs can be performed quickly.

With reference to the third aspect, in some implementations of the third aspect, the method further includes: resending the first MAC-CE when the first DCI is received within the running period of the first timer.

According to the link failure recovery method provided in this embodiment of this application, when the terminal device receives the first DCI within the running period of the first timer, the terminal device may resend the first MAC-CE to the network device, so that the terminal device may resend the first MAC-CE based on the indication of the network device.

With reference to the third aspect, in some implementations of the third aspect, the method further includes: resetting the first timer K time units after the first MAC-CE is resent, where K is a value greater than or equal to 0.

According to the link failure recovery method provided in this embodiment of this application, after resending the first MAC-CE, or when resending the first MAC-CE, the terminal device may reset the first timer, so that the first timer works again. In this way, a failure of current retransmission of the first MAC-CE can be avoided, a moment for retransmitting the first MAC-CE again may be further determined depending on whether the first timer expires, a problem of an excessively long delay of retransmitting the first MAC-CE can be avoided, time of retransmitting the MAC-CE used to indicate the information about the cell in which the link failure occurs is controlled, the network device is prevented from belatedly indicating the resource for retransmitting the first MAC-CE, and the link recovery of the cell in which the link failure occurs can be performed quickly.

It should be understood that an action performed by the terminal device when the first timer expires or within a running period of the first timer after the first timer is reset is similar to an action performed by the terminal device when the first timer expires or within the running period of the first timer after the terminal device starts the first timer for the first time. Details are not described herein.

With reference to the third aspect, in some implementations of the third aspect, the method further includes: stopping the first timer when the first response message is received within the running period of the first timer.

According to the link failure recovery method provided in this embodiment of this application, when the terminal device receives, within the running period of the first timer, the first response message used to indicate that the first MAC-CE is successfully transmitted, the terminal device can learn that the first MAC-CE is successfully transmitted and the first MAC-CE does not need to be retransmitted, and the terminal device may stop the first timer, so that the terminal device may determine a subsequent procedure based on a feedback of the network device.

With reference to the third aspect, in some implementations of the third aspect, the response message may be any one of the following signaling: fourth DCI, a physical downlink control channel (PDCCH) transmission configuration indicator (TCI) of the cell in which the link failure occurs, DCI in a dedicated search space set, DCI in a dedicated control resource set, or DCI scrambled by using a dedicated radio network temporary identifier RNTI, where the fourth DCI is used to indicate a downlink resource, or the fourth DCI and the second DCI have a same hybrid automatic repeat request process identifier HARQ process identifier and different NDIs.

According to the link failure recovery method provided in this embodiment of this application, the terminal device may learn, by receiving any one or more of the foregoing signaling, that the first MAC-CE is successfully transmitted, that is, the first response message of the first MAC-CE has a plurality of specific forms. This is not limited in this application, and a flexible selection solution is provided.

With reference to the third aspect, in some implementations of the third aspect, before the sending a first request message, the method further includes: sending a second request message when the first timer expires, where the second request message is used to indicate the link failure.

According to the link failure recovery method provided in this embodiment of this application, when the first timer expires, the terminal device may further send the second request message used to indicate a link failure event. In this way, according to the link failure recovery method provided in this application, the network device may be notified in time that the link failure event occurs in a cell, and the network device may allocate, in time, a new resource used to carry information about the cell in which the link failure occurs, to perform timely link recovery of the cell in which the link failure occurs.

In a possible implementation, if the terminal device reports the BFRQ message in a one-step reporting form before starting the first timer, the sending a second request message when the first timer expires is sending the second request message for the first time. This may be understood as that a form of reporting the BFRQ message by the terminal device changes from the one-step reporting form to a two-step reporting form.

In another possible implementation, if the terminal device reports the BFRQ message in a two-step reporting form before starting the timer, before the sending a first MAC-CE, the method further includes: sending the second request message. That is, the sending a second request message when the first timer expires may be resending the second request message.

With reference to the third aspect, in some implementations of the third aspect, the second request message is carried on a physical uplink control channel (PUCCH), or the second request message is carried on a physical random access channel (PRACH). The PUCCH resource or the PRACH resource may be a resource of a PCell or a resource of a PSCell.

According to the link failure recovery method provided in this embodiment of this application, the resource used by the terminal device to transmit the second request message may be the PUCCH or the PRACH, so that the network device learns in time that a link failure event occurs in a cell, and the network device may allocate, in time, a resource used to carry information about the cell in which the link failure occurs, to perform timely link recovery of the cell in which the link failure occurs.

With reference to the third aspect, in some implementations of the third aspect, the information about the cell in which the link failure occurs includes: identification information of the cell in which the link failure occurs and/or information about a reference signal resource, where the information about the reference signal resource is used for link recovery of the cell in which the link failure occurs.

According to the link failure recovery method provided in this embodiment of this application, the information about the cell in which the link failure occurs may be at least one of the identification information of the cell in which the link failure occurs and the information about the reference signal resource, to provide a flexible selection for the network device to learn of the cell in which the link failure occurs.

According to a fourth aspect, a link failure recovery apparatus is provided. The link failure recovery apparatus includes a processor, configured to implement a function of the terminal device in the methods described in the first aspect and the third aspect.

Optionally, the link failure recovery apparatus may further include a memory, the memory is coupled to the processor, and the processor is configured to implement the function of the terminal device in the methods described in the first aspect and the third aspect. In a possible implementation, the memory is configured to store program instructions and data. The memory is coupled to the processor, and the processor may invoke and execute the program instructions stored in the memory, to implement the function of the terminal device in the methods described in the first aspect and the third aspect.

Optionally, the link failure recovery apparatus may further include a communications interface, and the communications interface is used by the link failure recovery apparatus to communicate with another device. When the link failure recovery apparatus is a terminal device, the transceiver may be a communications interface or an input/output interface.

In a possible design, the link failure recovery apparatus includes the processor and the communications interface, configured to implement the function of the terminal device in the method described in the first aspect. Details are as follows:

The processor communicates with the outside by using the communications interface.

The processor is configured to run a computer program, to enable the apparatus to implement any method described in the first aspect.

It may be understood that the outside may be an object other than the processor, or an object other than the apparatus.

In a possible design, the link failure recovery apparatus includes the processor and the communications interface, configured to implement the function of the terminal device in the method described in the third aspect. Details are as follows:

The processor communicates with the outside by using the communications interface.

The processor is configured to run a computer program, to enable the apparatus to implement any method described in the third aspect.

It may be understood that the outside may be an object other than the processor, or an object other than the apparatus.

In another implementation, when the link failure recovery apparatus is a chip or a chip system, the communications interface may be an input/output interface, an interface circuit, an output circuit, an input circuit, a pin, a related circuit, or the like in the chip or the chip system. The processor may alternatively be embodied as a processing circuit or a logic circuit.

According to a fifth aspect, a link failure recovery apparatus is provided. The link failure recovery apparatus includes a processor, configured to implement a function of the network device in the method described in the second aspect.

Optionally, the link failure recovery apparatus may further include a memory, the memory is coupled to the processor, and the processor is configured to implement the function of the network device in the method described in the second aspect. In a possible implementation, the memory is configured to store program instructions and data. The memory is coupled to the processor, and the processor may invoke and execute the program instructions stored in the memory, to implement the function of the network device in the method described in the second aspect. Optionally, the link failure recovery apparatus may further include a communications interface, and the communications interface is used by the link failure recovery apparatus to communicate with another device. When the link failure recovery apparatus is a network device, the communications interface is a transceiver, an input/output interface, a circuit, or the like.

In a possible design, the link failure recovery apparatus includes the processor and the communications interface.

The processor sends second downlink control information DCI by using the communications interface, where the second DCI is used to indicate a first resource.

The processor is configured to start a first timer.

The processor determines, by using the communications interface depending on whether the first MAC-CE is received within a running period of the first timer, to send first DCI or a first response message, where the first DCI is used to indicate to resend the first MAC-CE, and the first response message is used to indicate that the first MAC-CE is successfully transmitted.

In another possible design, the link failure recovery apparatus is a chip or a chip system. The communications interface may be an input/output interface, an interface circuit, an output circuit, an input circuit, a pin, a related circuit, or the like in the chip or the chip system. The processor may alternatively be embodied as a processing circuit or a logic circuit.

According to a sixth aspect, a computer-readable storage medium is provided. The computer-readable storage medium stores a computer program. When the computer program is executed by a communications apparatus, the communications apparatus is enabled to implement the method according to any one of the first aspect and the third aspect and the possible implementations of the first aspect and the third aspect.

According to a seventh aspect, a computer-readable storage medium is provided. The computer-readable storage medium stores a computer program. When the computer program is executed by a communications apparatus, the communications apparatus is enabled to implement the method according to any one of the second aspect and the possible implementations of the second aspect.

According to an eighth aspect, a computer program product including instructions is provided. When the instructions are executed by a computer, a communications apparatus is enabled to implement the method according to any one of the first aspect and the third aspect and the possible implementations of the first aspect and the third aspect According to a ninth aspect, a computer program product including instructions is provided. When the instructions are executed by a computer, a communications apparatus is enabled to implement the method according to any one of the second aspect and the possible implementations of the second aspect.

According to a tenth aspect, a communications system is provided. The communications system includes the link failure recovery apparatus shown in the fourth aspect and the link failure recovery apparatus shown in the fifth aspect.

DESCRIPTION OF EMBODIMENTS

Figure 1A:
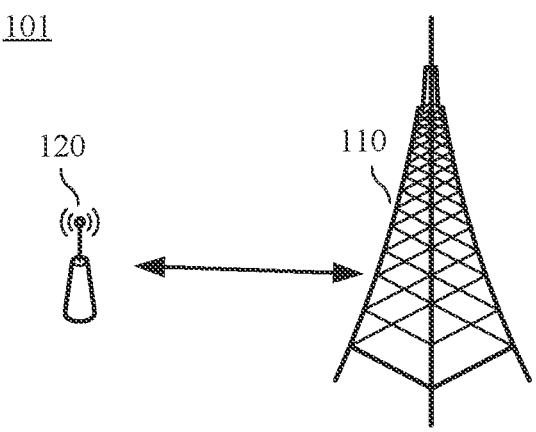
FIG. 1a to FIG. 1c are a schematic diagram of a system 100 to which a link failure recovery method according to an embodiment of this application is applicable.

The following describes the technical solutions in this application with reference to the accompanying drawings.

The technical solutions in the embodiments of this application may be applied to various communications systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a fifth generation (5th generation, 5G) system, a new radio (NR) system, or a future network. The 5G mobile communications system described in this application includes a non-standalone (NSA) 5G mobile communications system or a standalone (SA) 5G mobile communications system. The technical solutions provided in this application may be further applied to a future communications system, for example, a sixth generation mobile communications system. Alternatively, the communications system may be a public land mobile network (PLMN), a device-to-device (D2D) communications system, a machine-to-machine (M2M) communications system, an internet of things (IoT) communications system, or another communications system.

A terminal device (terminal equipment) in the embodiments of this application may be an access terminal, a subscriber unit, a subscriber station, a mobile station, a mobile console, a relay station, a remote station, a remote terminal, a mobile device, a user terminal, user equipment (UE), a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), a terminal device in a future internet of vehicles, or the like. This is not limited in the embodiments of this application.

By way of example, and not limitation, in the embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that can be directly worn by a user or integrated into clothes or an accessory of a user. The wearable device is not only a hardware device, but also implements a powerful function through software support, a data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In addition, the terminal device in the embodiments of this application may alternatively be a terminal device in an IoT system. IoT is an important part of future development of information technologies. A main technical feature of the IoT is connecting a thing to a network by using a communications technology, to implement an intelligent network for interconnection between a person and a machine or between one thing and another. In the embodiments of this application, an IoT technology may implement massive connections, deep coverage, and terminal power saving by using, for example, a narrowband (narrow band, NB) technology.

In addition, in the embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and sending uplink data to the network device.

The network device in the embodiments of this application may be any communications device that has a wireless transceiver function and that is configured to communicate with the terminal device. The device includes but is not limited to an evolved NodeB (eNB), a radio network controller (RNC), a NodeB (NB), a base station controller (BSC), a base transceiver station (BTS), a home base station (for example, a home evolved NodeB (HeNB), or a home NodeB (HNB)), a baseband unit (baseBand unit, BBU), an access point (AP) in a wireless fidelity (Wi-Fi) system, a wireless relay node, a wireless backhaul node, a transmission point (TP), a transmission reception point (TRP), or the like. Alternatively, the device may be a gNB or a transmission point (TRP or TP) in a 5G system such as an NR system, may be one antenna panel or a group of antenna panels (including a plurality of antenna panels) of a gNB in a 5G system, or may be a network node, such as a baseband unit (BBU) or a distributed unit (DU), that constitutes a gNB or a transmission point.

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (CN). This is not limited in this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an entity for performing a method provided in the embodiments of this application is not particularly limited in the embodiments of this application, provided that the entity can run a program that records code of the method provided in the embodiments of this application to perform communication according to the method provided in the embodiments of this application. For example, the entity for performing the method provided in the embodiments of this application may be a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable storage media" may include but is not limited to a radio channel, and various other media that can store, include, and/or carry instructions and/or data.

FIG. 1a is a schematic diagram of a system 101 to which a link failure recovery method according to an embodiment of this application is applicable. The communications system 101 is in a single-carrier scenario or a carrier aggregation (CA) scenario. The communications system 100 includes a network device 110 and a terminal device 120. The network device 110 communicates with the terminal device 120 by using a wireless network. After the terminal device 120 detects that a link between the network device 110 and the terminal device 120 is faulty, the terminal device 120 sends a link failure recovery request (beam failure recovery request, BFRQ) message to the network device 110. Optionally, after receiving the BFRQ message, the network device 110 sends a link failure recovery response (beam failure recovery response, BFRR) message to the terminal device 120 or reconfigures a link.

It should be understood that, the network device 110 in FIG. 1a may include one or more cells, for example, a first cell and a second cell. If a link that is between the terminal device and the network device and that is in the second cell is faulty, the first cell may assist in link recovery of the second cell. For example, the terminal device may send the BFRQ message to the network device on an uplink resource that belongs to the first cell, and the terminal device may receive, on a downlink resource that belongs to the second cell, the BFRR message sent by the network device.

When transmission of the communications system 100 is uplink transmission, the terminal device 120 is a transmit end, and the network device 110 is a receive end. When transmission of the communications system 100 is downlink transmission, the network device 110 is a transmit end, and the terminal device 120 is a receive end.

Figure 1B:
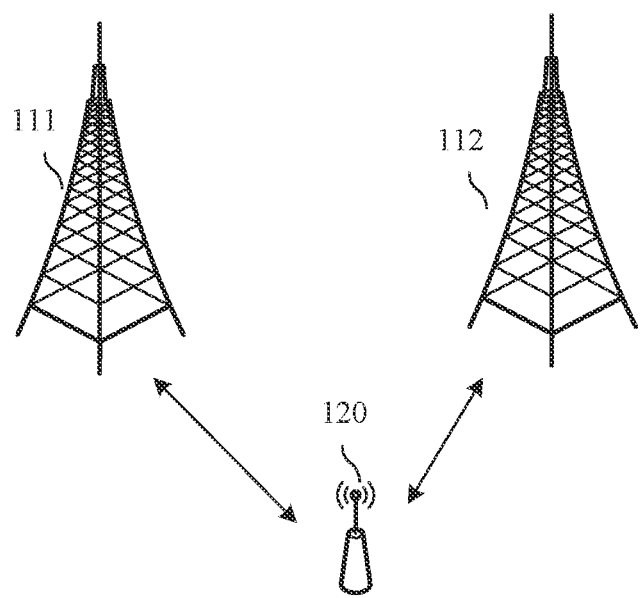

FIG. 1b is a schematic diagram of a system 102 to which a link failure recovery method according to an embodiment of this application is applicable. The communications system 102 is in a dual connectivity (DC) or coordinated multipoint transmission/reception (CoMP) scenario. The communications system 102 includes a network device 111, a network device 112, and a terminal device 120. The network device 111 is a network device initially accessed by the terminal device 120 and is responsible for RRC communication with the terminal device 120. The network device 112 is added during RRC reconfiguration, and is configured to provide an additional radio resource. The terminal device 120 for which carrier aggregation is configured is connected to the network device 111 and the network device 112. A link between the network device 111 and the terminal device 120 may be referred to as a first link, and a link between the network device 112 and the terminal device 120 may be referred to as a second link.

When both the network device 111 and the network device 112 may configure, for the terminal device 120, uplink resources used to transmit a BFRQ message, if the first link or the second link is faulty, the terminal device 120 may send the BFRQ message to the network device 111 or the network device 112 on the uplink resource used to transmit the BFRQ message. After receiving the BFRQ message, the network device 111 or the network device 112 sends a BFRR message to the terminal device 120.

Particularly, if the network device 112 does not configure an uplink resource used to transmit a BFRQ message, when the second link is faulty, the terminal device 120 may forward a BFRQ message to the network device 112 by using the network device 111, so that the network device 112 can recover the second link.

The communications system to which this application is applicable is merely an example for description, and the communications system to which this application is applicable is not limited thereto. For example, other quantities of network devices and terminal devices may alternatively be included in the communications system, or a single base station scenario, a multi-carrier aggregation scenario, a dual connectivity scenario, or a D2D communication scenario may be used.

It should be understood that, the technical solutions in some embodiments of this application may be applied to a CA scenario in which one cell assists in link recovery of another cell or a plurality of cells, or a DC scenario in which one cell in one cell group assists in link recovery of another cell or a plurality of cells.

It should be understood that, the technical solutions in the embodiments of this application may be further applied to a single-carrier scenario, a CA scenario, or a DC scenario in which in a cell, link failure recovery of the cell is performed on a resource of the cell.

It should be understood that, a primary cell (PCell) to which the technical solutions in the embodiments of this application are applicable may use a high frequency or a low frequency, and a secondary cell (SCell) to which the technical solutions in the embodiments of this application are applicable may use a high frequency or a low frequency. For example, when the PCell uses a low frequency, the SCell uses a high frequency. In a possible implementation, for an SCell for which no uplink resource is configured, an uplink resource of the PCell may be used to assist in link recovery of the SCell. Usually, the low frequency and the high frequency are relative to each other, or may be differentiated based on a specific frequency, for example, 6 GHz.

It should be understood that, the technical solutions in the embodiments of this application may be further applied to a CoMP scenario in which one TRP assists another TRP in recovering a link. CoMP may be one or more of a non-coherent joint transmission (NCJT) scenario, a coherent joint transmission (CJT) scenario, a joint transmission (JT) scenario, or the like.

Figure 1C:
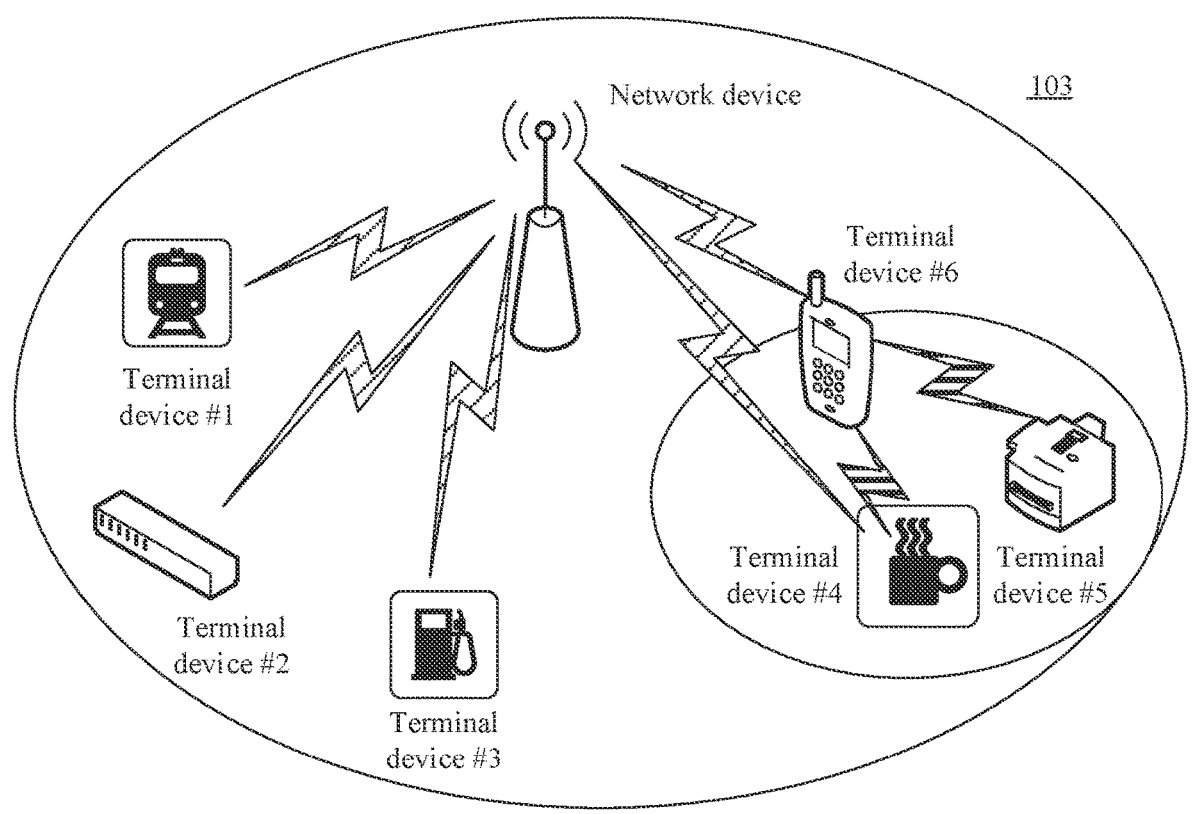

The following briefly describes signaling exchange between a network device and a terminal device by using FIG. 1c. FIG. 1c is a schematic diagram of a system 103 to which a link failure recovery method according to an embodiment of this application is applicable. The system 103 includes at least one terminal device (for example, a terminal device #1, a terminal device #2, a terminal device #3, a terminal device #4, a terminal device #5, and a terminal device #6 shown in FIG. 1c) and a network device. The network device is configured to provide a communication service for the terminal device and enables the terminal device to access a core network. The terminal device may access the network device by searching for a synchronization signal, a broadcast signal, or the like sent by the network device, to communicate with the network device. The terminal device #1, the terminal device #2, the terminal device #3, the terminal device #4, the terminal device #5, and the terminal device #6 in FIG. 1c may perform uplink and downlink transmission with the network device. For example, the network device may send downlink signals to the terminal device #1, the terminal device #2, the terminal device #3, the terminal device #4, the terminal device #5, and the terminal device #6, and may also receive uplink signals sent by the terminal device #1, the terminal device #2, the terminal device #3, the terminal device #4, the terminal device #5, and the terminal device #6.

In addition, the terminal device #4, the terminal device #5, and the terminal device #6 may also be considered as a communications system. The terminal device #6 may send downlink signals to the terminal device #4 and the terminal device #5, and may also receive uplink signals sent by the terminal device #4 and the terminal device #5.

It should be noted that, the embodiments of this application may be applied to a communications system including one or more network devices, or may be applied to a communications system including one or more terminal devices. This is not limited in this application.

To facilitate understanding of the link failure recovery method provided in the embodiments of this application, the following briefly describes several basic concepts in the embodiments of this application.

1. Control Resource Set (CORESET)

To improve efficiency of blindly detecting a control channel by the terminal device, the concept of control resource set is proposed in an NR standard formulation process. The control resource set is one or more resource sets configured by the network device for the terminal device, and is used to send a physical downlink control channel (PDCCH). Specifically, the network device may send the control channel to the terminal device on any control resource set corresponding to the terminal device. In addition, the network device further needs to notify the terminal device of another configuration, for example, a search space set, associated with the control resource set. Configuration information of each control resource set is different, for example, frequency domain widths and time domain lengths of different control resource sets are different. Further, the control resource set in this application may be a CORESET, a control region, or an enhanced physical downlink control channel (E-PDCCH) set, or the like that is defined in a 5G mobile communications system.

A time-frequency position occupied by the PDCCH may be referred to as a downlink control region. In LTE, the PDCCH is always located on the first m (where possible values of m are 1, 2, 3, and 4) symbols of a subframe. It should be noted that, in LTE, an E-PDCCH and a relay-physical downlink control channel (R-PDCCH) are not located on the first m symbols of a subframe.

In NR, the downlink control region may be flexibly configured by using RRC signaling based on a control resource set (CORESET) and a search space set.

In the control resource set, information such as a frequency domain position of a PDCCH or a control channel element (CCE), and a quantity (where a maximum value is 3) of consecutive time domain symbols may be configured.

In the search space set, information such as a PDCCH detection periodicity and offset, and a start symbol in a slot may be configured. For example, if it may be configured in the search space set in such a manner that the PDCCH periodicity is one slot and the start symbol in time domain is a symbol 0, the terminal device may detect a PDCCH at a start position of each slot.

2. Quasi Co-Location/Quasi-Colocation (QCL) Assumption Information

The QCL assumption information may also be referred to as QCL information for short. The QCL information is used to assist in describing receive beamforming information and a receiving procedure of the terminal device. The QCL information is used to indicate a QCL relationship between two reference signals. A target reference signal may be usually a demodulation reference signal (DMRS), a CSI-RS, or the like. A referenced reference signal or a source reference signal may be usually a CSI-RS, a TRS, an SSB, or the like.

Spatial relation information is used to assist in describing transmit-side beamforming information and a transmission procedure of the terminal device. The spatial relation information is used to indicate a spatial transmit parameter relationship between two types of reference signals. The target reference signal may be usually a DMRS, an SRS, or the like, and the referenced reference signal or the source reference signal may be usually a CSI-RS, an SRS, an SSB, or the like.

It should be understood that, spatial characteristic parameters of two reference signals or channels that satisfy a QCL relationship are the same, so that a spatial characteristic parameter of the target reference signal can be inferred based on a resource index of the source reference signal.

It should be further understood that, spatial characteristic parameters of two reference signals or channels that satisfy spatial relation information are the same, so that the spatial characteristic parameter of the target reference signal can be inferred based on the resource index of the source reference signal.

The spatial characteristic parameter includes one or more of the following parameters:

an angle of arrival (AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, transmit beamforming of the terminal device, receive beamforming of the terminal device, a spatial channel correlation, transmit beamfornming of the network device, receive beamforming of the network device, an average channel gain, an average channel delay (average delay), a delay spread, a Doppler spread, a Doppler shift, a spatial reception parameter (spatial Rx parameters), or the like.

These spatial characteristic parameters describe a characteristic of a spatial channel between an antenna port for the source reference signal and an antenna port for the target reference signal, and help the terminal device complete receive-side beamforming or a receiving processing process based on the QCL information. It should be understood that, the terminal device may receive the target reference signal based on information about a receive beam for the source reference signal indicated by the QCL information. These spatial characteristic parameters further help the terminal device complete transmit-side beamforming or a transmission processing process based on the spatial relation information. It should be understood that the terminal device may transmit the target reference signal based on information about a transmit beam for the source reference signal indicated by the spatial correlation information.

To reduce overheads of indicating the QCL information by the network device for the terminal device, in an optional implementation, the network device may indicate that a demodulation reference signal of the PDCCH or a physical downlink shared channel (PDSCH) and one or more of a plurality of reference signals previously reported by the terminal device satisfy a QCL relationship. For example, the reference signal may be a CSI-RS. Herein, each reported CSI-RS resource index corresponds to one transmit-receive beam pair that is previously established during measurement performed by using a CSI-RS resource. It should be understood that, information about receive beams for the two reference signals or channels that satisfy the QCL relationship is the same, and the terminal device may infer, based on resource indexes of the reference signals, information about receive beams for receiving the PDCCH or the PDSCH.

Four types of QCL are defined in an existing standard, and the network device may simultaneously configure one or more types of QCL for the terminal device, for example, QCL types A+D, and QCL types C+D:

QCL types A: Doppler shift, Doppler spread, average delay, delay spread

QCL types B: Doppler shift, Doppler spread

QCL types C: average delay, Doppler shift

QCL types D: Spatial Rx parameter

In an example of this application, correspondences between some parameters may also be used in descriptions of a QCL scenario.

It should be understood that, in a scenario applicable to a QCL assumption in this application, there may alternatively be an association relationship between two reference signals, or may further be an association relationship between transmission objects.

3. Transmission Configuration Indicator (TCI) State

One TCI state may include one or two referenced reference signals and an associated QCL type. QCL types may further be classified into four categories: A, B, C, and D that are different combinations or selections of {Doppler shift, Doppler spread, average delay, delay spread, spatial Rx parameter}. The TCI state includes QCL information, or the TCI state is used to indicate QCL information.

4. Beam

The beam is a communication resource, and different beams may be considered as different communication resources. The different beams may be used to send same information, or may be used to send different information. The beam may correspond to at least one of a time domain resource, a space resource, and a frequency domain resource.

Optionally, a plurality of beams having a same communication feature or similar communication features may be considered as one beam, and one beam may include one or more antenna ports used to transmit a data channel, a control channel, a sounding signal, and the like. For example, a transmit beam may refer to signal strength distribution formed in different directions in space after a signal is transmitted through an antenna, and a receive beam may refer to signal strength distribution in different directions in space of a radio signal received from an antenna.

Specifically, the beam may be a wide beam, may be a narrow beam, or may be a beam of another type. A technology for forming a beam may be a beamforming technology or another technical means. This is not limited in this application. With the use of the beamforming (beam forming) technology, a higher antenna array gain may be achieved by sending or receiving a signal in a specific direction in space. In addition, beams may be classified into a transmit beam and a receive beam of the network device and a transmit beam and a receive beam of the terminal device. The transmit beam of the network device is used to describe receive-side beamforming information of the network device, and the receive beam of the network device is used to describe receive-side beamforming information of the network device. The transmit beam of the terminal device is used to describe transmit-side beamforming information of the terminal device, and the receive beam of the terminal device is used to describe receive-side beamforming information.

More specifically, the beamforming technology includes a digital beamforming technology, an analog beamforming technology, and a hybrid digital analog beamforming technology. The analog beamforming technology may be implemented by using a radio frequency. For example, a phase of a radio frequency chain (RF chain) is adjusted by using a phase shifter, to control a change in an analog beam direction. Therefore, one RF chain can generate only one analog beam at a same moment. In addition, for communication based on the analog beam, a beam at a transmit end and a beam at a receive end need to be aligned. Otherwise, a signal cannot be normally transmitted.

It should be understood that, one or more antenna ports forming one beam may also be considered as one antenna port set.

It should be further understood that, the beam may be further represented by using a spatial filter or a spatial transmission filter (spatial domain transmission filter). In other words, the beam may also be referred to as the "spatial filter". A transmit beam is referred to as a "spatial transmit filter", and a receive beam is referred to as a "spatial receive filter" or a "downlink spatial filter". The receive beam of the network device or the transmit beam of the terminal device may also be referred to as an "uplink spatial filter", and the transmit beam of the network device or the receive beam of the terminal device may also be referred to as a "downlink spatial filter". N best beam pairs (beam pair links, BPLs) (where one BPL includes one transmit beam of the network device and one receive beam of the terminal device, or one BPL includes one transmit beam of the terminal device and one receive beam of the network device) are selected. The terminal device selects the transmit beam of the network device and/or the receive beam of the terminal device based on beam sweeping performed by the network device, and the network device selects the transmit beam of the terminal device and/or the receive beam of the network device based on beam sweeping performed by the terminal device.

Specifically, the transmit beam may be a transmit beam of the network device, or may be a transmit beam of the terminal device. When the transmit beam is the transmit beam of the network device, the network device sends reference signals to the terminal device by using different transmit beams, and the terminal device receives, by using a same receive beam, the reference signals sent by the network device by using the different transmit beams, determines a best transmit beam of the network device based on the received signals, and then feeds back the best transmit beam of the network device to the network device, so that the network device updates the transmit beam. When the transmit beam is the transmit beam of the terminal device, the terminal device sends reference signals to the network device by using different transmit beams, and the network device receives, by using a same receive beam, the reference signals that are sent by the terminal device by using the different transmit beams, determines a best transmit beam of the terminal device based on the received signals, and then feeds back the best transmit beam of the terminal device to the terminal device, so that the terminal device updates the transmit beam. A process of sending the reference signals by using the different transmit beams may be referred to as beam sweeping, and a process of determining the best transmit beam based on the received signals may be referred to as beam matching.

The receive beam may be a receive beam of the network device, or may be a receive beam of the terminal device. When the receive beam is the receive beam of the network device, the terminal device sends reference signals to the network device by using a same transmit beam, and the network device receives, by using different receive beams, the reference signals sent by the terminal device, and then determines a best receive beam of the network device based on the received signals, to update the receive beam of the network device. When the receive beam is the receive beam of the terminal device, the network device sends reference signals to the terminal device by using a same transmit beam, and the terminal device receives, by using different receive beams, the reference signals sent by the network device, and then determines a best receive beam of the terminal device based on the received signals, to update the receive beam of the terminal device.

It should be noted that, for downlink beam training, the network device configures a type of a reference signal resource set for beam training. When a repetition parameter configured for the reference signal resource set is "on", the terminal device assumes that reference signal resources in the reference signal resource set are transmitted by using a same downlink spatial filter, that is, are transmitted by using a same transmit beam. In this case, usually, the terminal device receives the reference signal resources in the reference signal resource set by using different receive beams, and obtains a best receive beam of the terminal device through training. Optionally, the terminal device may report best channel quality that is of reference signals corresponding to N reference signal resources and that is measured by the terminal device. When the repetition parameter configured for the reference signal resource set is "off", the terminal device does not assume that the reference signal resources in the reference signal resource set are transmitted by using the same downlink spatial filter, that is, does not assume that the network device transmits the reference signal resources by using the same transmit beam. In this case, the terminal device selects N best beams from the resource set by measuring channel quality of reference signals corresponding to the reference signal resources in the set, and feeds back the N best beams to the network device. Usually, in this case, the terminal device uses a same receive beam in this process.

5. Concepts Related to Cells and Carriers

CA:

A plurality of consecutive or non-consecutive component carriers are aggregated into a larger bandwidth (for example, up to 100 MHz), to meet a bandwidth requirement of the 3GPP.

Component Carrier (CC):

Each carrier in multi-carrier aggregation may be referred to as a "CC". Each carrier includes one or more physical resource blocks (PRBs). There may be a corresponding physical downlink control channel (PDCCH) on each carrier, and the PDCCH is used to schedule a physical downlink control channel (PDSCH) on the respective CC. Alternatively, there may be no PDCCH, but the PDSCH is scheduled by using a PDCCH on another CC. When the terminal device may receive data on a plurality of CCs, the CCs may also be referred to as component carriers, component carriers, component carriers, or the like.

PCell:

The PCell is a cell on which a CA terminal device camps.

PSCell:

The PSCell is a special secondary cell of a secondary network device (secondary eNodeB, SeNB) that is configured by a master network device (master eNodeB, MeNB) for a DC terminal device by using RRC connection signaling.

SCell:

The SCell is a cell configured for the CA terminal device by using RRC connection signaling, works on an SCC (secondary component carrier), and may provide more radio resources for the CA terminal device. In the SCell, there may be only downlink transmission or both uplink and downlink transmission.

Special Cell (SpCell):

In a dual connectivity (DC) scenario, the SpCell is a PCell in a master cell group (MCG) or a PSCell in a secondary cell group (SCG); and in a CA scenario, the SpCell is a PCell.

MCG/SCG:

MCG: The master cell group is a group in which a cell that provides a service for the terminal device and that is served by a master network device is located. In a dual connectivity mode, a group of serving cells associated with the MeNB includes a PCell and one or more SCells.

SCG: The secondary cell group is a group in which a cell that provides a service for the terminal device and that is served by a secondary network device is located. In the dual connectivity mode, a PSCell and zero or a plurality of SCells are included.

MeNB/SeNB:

The MeNB is a network device to which a cell on which the DC terminal device camps belongs.

The SeNB is another network device configured by the MeNB for the DC terminal device by using RRC connection signaling.

6. MAC-CE Retransmission Mechanism

A MAC layer on a terminal device side processes a new data indicator (NDI) field in downlink control information (DCI) as follows:

(1) If the first downlink resource allocation is performed on a cell radio network temporary identifier (C-RNTI) of the terminal device, it is considered that the NDI field has been flipped.

(2) If downlink resource allocation is performed on a C-RNTI of the terminal device, and downlink resource allocation is previously performed on a semi-persistent scheduling (SPS) C-RNTI of the terminal device in a same hybrid automatic repeat request (HARQ), or downlink resource allocation is configured for the C-RNTI of the terminal device, it is considered that the NDI field has been flipped.

In a case in which downlink resource allocation is performed on the SPS C-RNTI of the terminal device:

If the NDI field is 1, it is considered that the NDI field is not flipped. If the NDI field is 0 and corresponding PDCCH content does not indicate to release an SPS resource, downlink resource allocation in a current transmission time interval (TTI) is saved as the configured downlink resource allocation, and it is also considered that the NDI field has been flipped.

(3) In a case other than the foregoing cases, if resource allocation is configured in the current TTI and not in a measurement gap, it is considered that the NDI field has been flipped.

(4) In a case other than the foregoing cases, the terminal device side compares an NDI value received by using a transport block (TB) in the current TTI with an NDI value recently received by using the TB, to determine whether the NDI field has actually been flipped.

According to a specification in a current protocol, if the NDI field has been flipped, it is considered that data is initially transmitted, that is, the MAC-CE is newly transmitted; in a case other than the foregoing cases, it is considered that the MAC-CE is retransmitted.

7. Reference Signal Resource Configured for Link Failure Detection and Link Failure Recovery To detect a link failure, the network device needs to configure a beam failure detection reference signal resource (beam failure detection RS resource) set for the terminal device. The beam failure detection RS resource set may also be referred to as a link failure detection reference signal resource set. For ease of differentiation and description, in the embodiments of this application, the reference signal resource set used for beam failure detection is referred to as a first reference signal resource set.

It should be understood that, there is a correspondence between a reference signal resource and a reference signal, and the reference signal resource in the embodiments of this application may also be referred to as a reference signal for short. For example, the beam failure detection RS resource may also be described as a beam failure detection RS, a beam failure detection RS resource configuration, or a failure detection resource in a protocol.

Specifically, the network device configures the first reference signal resource set for the terminal device in the following two possible configuration manners:

(1) The network device explicitly configures the first reference signal resource set for the terminal device. For example, the network device configures a beam failure detection RS resource configuration set for the terminal device, or the network device configures a beam failure detection RS set for the terminal device, or the network device configures a failure detection resource set for the terminal device. Specifically, the network device may configure the first reference signal resource set for the terminal device by using one or more of RRC signaling, MAC-CE signaling, DCI signaling, or the like.

(2) The network device implicitly configures the first reference signal resource set for the terminal device. For example, the network device indicates a TCI of a PDCCH, where a reference signal resource associated with the TCI is used as a reference signal resource in the first reference signal resource set, and the reference signal resource is a reference signal resource that satisfies a QCL relationship with a DMRS of the PDCCH and is a reference signal resource that is periodically sent.

It should be understood that, that the network device explicitly or implicitly configures the first reference signal resource set for the terminal device is merely an example, and this shall not constitute any limitation on the protection scope of this application.

Optionally, when the network device explicitly configures the first reference signal resource set for the terminal device, the terminal device may detect, based on the first reference signal resource set, whether a link fails.

Optionally, when the network device does not explicitly configure the first reference signal resource set for the terminal device, the terminal device may first determine the first reference signal resource set in the foregoing implicit indication manner, and then detect, based on the first reference signal resource set, whether a link fails.

The reference signal resource in the first reference signal resource set satisfies the QCL relationship with a demodulation reference signal resource of the PDCCH, or the reference signal resource in the first reference signal resource set uses a same TCI state as the PDCCH. When channel quality of reference signals corresponding to some or all of reference signal resources in the first reference signal resource set (for example, reference signal received power (RSRP), a channel quality indicator (CQI) of the reference signal, a block error rate (BLER) of the reference signal, a signal to interference plus noise ratio (SINR) of the reference signal, or a signal-to-noise ratio (signal noise ratio, SNR) of the reference signal) is lower than a first preset threshold, a link failure is determined.

Further, that channel quality of reference signals corresponding to some or all reference signal resources in the first reference signal resource set is lower than a first preset threshold may be that the channel quality of the reference signals corresponding to some or all of the reference signal resources in the first reference signal resource set is lower than the first preset threshold for W consecutive times, or may be that the channel quality of the reference signals corresponding to some or all of the reference signal resources in the first reference signal resource set is lower than the first preset threshold for W times in a specific time period, where W is a positive integer. The first preset threshold may be referred to as a link failure detection threshold, or may be referred to as a link failure threshold or the like.

It should be understood that, any threshold used for link failure detection may be the foregoing first preset threshold, and any reference signal resource used for link failure detection may be a reference signal resource in the foregoing first reference signal resource set. Names of the first preset threshold and the first reference signal resource set are not limited in this application.

Optionally, the first preset threshold may be configured by the network device, or the first preset threshold may be a threshold the same as a radio link failure out-of-synchronization (out of sync, OOS) threshold.

Optionally, when the network device configures the first preset threshold, the terminal device may detect, based on the first preset threshold, whether the link fails; or when the network device does not configure the first preset threshold, the terminal device may use the radio link failure out-of-synchronization threshold as the first preset threshold, and detects, based on the first preset threshold, whether the link fails.

It should be understood that, the reference signal corresponding to the reference signal resource in the first reference signal resource set may be a reference signal used by the terminal device to detect channel quality of a transmit beam of the network device, and the transmit beam is a beam used by the network device to communicate with the terminal device. Therefore, the detecting whether the link fails may also be referred as to detecting whether the beam fails.

Further, for link failure recovery, the network device may further indicate, to the terminal device, a beam recovery reference signal resource set (for example, a candidate beam RS list, a candidate beam RS identification resource, a beam failure candidate beam resource, a candidate beam identification RS, or a candidate beam list) used to recover a link between the terminal device and the network device, where the beam recovery reference signal resource set may also be referred to as a reference signal resource set or a link failure recovery reference signal resource set. For ease of differentiation and description, in the embodiments of this application, the beam recovery reference signal resource set used to recover the link between the terminal device and the network device is referred to as a second reference signal resource set.

For example, the network device may explicitly configure the second reference signal resource set for the terminal device. Specifically, the network device may configure the second reference signal resource set for the terminal device by using one or more of RRC signaling, MAC-CE signaling, DCI signaling, or the like.

For another example, the second reference signal resource set may alternatively be a default reference signal resource set (for example, a reference signal resource set used for beam management (BM), a reference signal resource set used for radio resource management (RRM) measurement, or a reference signal resource set that reuses another function). The reference signal resource set used for BM may be a reference signal resource set with a repetition identifier being "off" (or may be a reference signal resource set with a repetition identifier being "on").

Specifically, after the terminal device detects the link failure, the terminal device needs to select, from the second reference signal resource set, a reference signal whose channel quality information (for example, RSRP, RSRQ, a CQI, or a SINR) is higher than a second preset threshold and that corresponds to a reference signal resource, for link failure recovery. The second reference signal resource set may also be understood as a reference signal resource set used by the terminal device to initiate beam reconfiguration after the terminal device determine that a beam failure occurs on a transmit beam of the network device.

Optionally, when the network device configures the second reference signal resource set for the terminal device, the terminal device selects a reference signal resource from the second reference signal resource set, for link failure recovery.

Optionally, when the network device does not configure the second reference signal resource set for the terminal device, the terminal device selects a reference signal resource from the default reference signal resource set, for link failure recovery. The default reference signal set is another possible form of the second reference signal resource set.

Specifically, that the terminal device selects a reference signal resource from the second reference signal resource set includes. The terminal device selects, from the second reference signal resource set, a reference signal resource corresponding to a reference signal whose channel quality is greater than the second preset threshold as the reference signal resource.

Optionally, the second preset threshold may be configured by the network device, or the second preset threshold may be a predefined threshold. For example, when the network device does not configure the second preset threshold, it is considered by default that the second preset threshold is a threshold used for mobility measurement. The second preset threshold may be referred to as a link failure recovery threshold, or may be referred to as a link recovery threshold. It should be understood that, any threshold used for link failure recovery may be the second preset threshold. A name of the second preset threshold is not limited in this application.

In the embodiments of this application, the link failure may also be referred to as a communication failure, a beam failure, a beam fault, a link fault, a communication fault, a communications link failure, a communications link fault, or the like. In the embodiments of this application, these concepts have a same meaning. The link failure may mean that channel quality of a reference signal used for PDCCH beam failure detection is less than or equal to the first preset threshold. After a communications link fault, the terminal device needs to select, from the second reference signal resource set, a reference signal resource corresponding to a reference signal whose channel quality information (for example, RSRP, RSRQ, a CQI, or a SINR) is higher than the second preset threshold, used for communications link recovery.

In the embodiments of this application, the link failure recovery may also be referred to as recovery of communication between the network device and the terminal device, beam failure recovery, beam fault recovery, beam recovery, communication failure recovery, link fault recovery, link recovery, communication failure recovery, communication fault recovery, communications link failure recovery, communications link fault recovery, communication recovery, link reconfiguration, or the like.

In the embodiments of this application, a link failure recovery request message may also be referred to as a beam failure recovery request (BFRQ) message, a beam fault recovery request message, a beam recovery request message, a communication failure recovery request message, a link fault recovery request message, a link recovery request message, a communication fault recovery request message, a communication recovery request message, a communications link failure recovery request message, a communications link fault recovery request message, a communications link recovery request message, a link reconfiguration request message, a reconfiguration request message, or the like. Optionally, the link failure recovery request refers to sending a signal on a resource used to carry the link failure recovery request message. It should be understood that, in the embodiments of this application, the link failure recovery request message may be referred to as a first request message, a second request message, and/or a third request message.

In the embodiments of this application, a link failure recovery response message may also be referred to as a beam failure recovery response (BFRR) message, a beam fault recovery response message, a beam failure response message, a beam fault response message, a beam recovery response message, a link failure recovery response message, a link fault recovery response message, a communication failure response message, a link fault response message, a link recovery response message, a communication fault recovery response message, a communication failure response message, a communication fault response message, a communication recovery response message, a communications link failure recovery response message, a communications link fault recovery response message, a communications link fault response message, a communications link failure response message, a communications link response message, a link reconfiguration response message, a reconfiguration response message, or the like. It should be understood that, in the embodiments of this application, the link failure recovery response message may be referred to as a response message for short.

In the embodiments of this application, the link failure recovery response message may refer to receiving, on a control resource set and/or a search space set used to send the link failure recovery response, DCI whose CRC is scrambled by using a C-RNTI. The link failure recovery response information may alternatively be DCI scrambled by using other information (for example, DCI scrambled by using a beam failure recovery radio network temporary identifier (BFR-RNTI)). The link failure recovery response information may alternatively be data scheduled by using the DCI. The link failure recovery response message may alternatively be an acknowledgment (ACK) of the data scheduled by using the DCI. The link failure recovery response message may alternatively be one of the following messages:

DCI scrambled by using a cell radio network temporary identifier C-RNTI, DCI scrambled by using an MCS-C-RNTI, downlink control information DCI in a dedicated search space, DCI scrambled by using a dedicated RNTI, DCI scrambled by using a random access radio network temporary identifier (RA-RNTI), DCI including a preset status value, DCI including TCI information, QCL indication information of a cell in which a link failure occurs, or DCI in a preset format, where the DCI in the preset format indicates newly transmitted data. This is not limited in this embodiment of this application.

A link recovery failure of a cell may be understood as that the terminal device no longer sends a first request message, a second request message, and/or a third request message that correspond/corresponds to the cell; may be understood as stopping timing of a link failure recovery clock; or may be understood as stopping counting of a link failure recovery counter, or the like. Alternatively, a link recovery failure of a cell may be understood as that no response information of the cell is received yet when a link failure recovery clock corresponding to the cell expires and/or counting of a link failure recovery counter exceeds a maximum quantity of times or reaches the maximum quantity of times. The link failure recovery counter is used to count a quantity of times that the link failure recovery request message is sent. Optionally, a media access control (MAC) layer of the terminal device maintains a link failure recovery timer (beam failure recovery timer) and a link failure recovery counter (beam failure recovery counter). The link failure recovery timer is used to control an entire time length of link failure recovery. The link failure recovery counter is used to limit a quantity of times that the terminal device sends a link failure recovery request. When the link failure recovery counter reaches a maximum value, the terminal device considers that the link failure recovery fails, and stops a link failure recovery process. A time length of recovery of the recovery timer and a count value of the recovery counter may be configured by the network device, or may be preset values.

It should be understood that, in this application, a link recovery success of a cell may be understood as that the terminal device detects a response message of the cell.

It should be understood that, "detection" in the embodiments of this application may be understood as "receiving", or may be understood as "decoding".

It should be understood that, in this application, a time unit may be one or more radio frames, one or more subframes, one or more slots, one or more mini-slots, one or more orthogonal frequency division multiplexing (OFDM) symbols, or the like defined in the LTE system or the 5G NR system, or may be a time window including a plurality of frames or subframes, for example, a system information (SI) window.

It should be understood that, in the embodiments of this application, interaction between the terminal device and the network device is generally corresponding. To be specific, the terminal device sends information, and correspondingly, the network device also receives the information. Alternatively, the network device sends information, and correspondingly, the terminal device also receives the information. Further, physical resources used by the network device and the terminal device to send and receive information or rules, for example, periodicities or priority sequences applied by the network device and the terminal device to send and receive the information are also corresponding. This is not limited in the embodiments of this application.

It should be further understood that, in the embodiments of this application, the "cell" may be understood as a "serving cell" or a "carrier". Optionally, the cell includes at least one of a downlink carrier, an uplink (UL) carrier, and a supplementary uplink (SUL) carrier. Specifically, the cell may include a downlink carrier and an uplink carrier; or the cell may include a downlink carrier and a supplementary uplink carrier; or the cell includes a downlink carrier, an uplink carrier, and a supplementary uplink carrier.

Optionally, a carrier frequency of the supplementary uplink carrier is lower than that of the uplink carrier, to improve uplink coverage.

Optionally, usually, in a frequency division duplex (FDD) system, carrier frequencies of an uplink carrier and a downlink carrier are different, and in a time division duplex (TDD) system, carrier frequencies of an uplink carrier and a downlink carrier are the same.

It should be further understood that, in the embodiments of this application, an uplink resource is on the uplink carrier, and a downlink resource is on the downlink carrier.

It should be further understood that, in the embodiments of this application, the uplink carrier may be a normal uplink carrier, or may be a SUL carrier.

It should be understood that, in this application, "cell identification information" is used to indicate a "cell index", a "cell identifier", or other information that can identify a cell. For example, the cell index may be indicated by using a bitmap. Examples are not provided for description herein one by one.

It should be understood that, in the embodiments of this application, "indicating a link failure" may be understood as "indicating that a link failure occurs in at least one cell", or may be understood as "indicating a cell in which a link failure occurs".

It should be understood that, in the embodiments of this application, interaction between the terminal device and the network device is generally corresponding. To be specific, the terminal device sends information, and correspondingly, the network device also receives the information. Alternatively, the network device sends information, and correspondingly, the terminal device also receives the information. Further, physical resources used by the network device and the terminal device to send and receive information or rules, for example, periodicities or priority sequences applied by the network device and the terminal device to send and receive the information are also corresponding. This is not limited in the embodiments of this application.

In addition, to facilitate understanding of the embodiments of this application, the following several descriptions are provided.

First, in this application, "being used to indicate" may include "being used to directly indicate" and "being used to indirectly indicate". When a piece of indication information is described as being used to indicate A, the indication information may directly indicate A or indirectly indicate A, but it does not necessarily indicate that the indication information carries A.

Information indicated by the indication information is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of all pieces of information may be further identified and indicated in a unified manner, to reduce indication overheads caused by separately indicating same information. For example, a person skilled in the art should understand that a precoding matrix includes precoding vectors, and each precoding vector in the precoding matrix may have a same part in terms of composition or another attribute.

In addition, a specific indication manner may alternatively be various existing indication manners, for example, but not limited to, the foregoing indication manners and various combinations thereof. For details of various indication manners, refer to the conventional technology. Details are not described in this specification. It can be learned from the foregoing descriptions that, for example, when a plurality of pieces of information of a same type need to be indicated, manners of indicating different information may be different. In a specific implementation process, a required indication manner may be selected according to a specific requirement. The selected indication manner is not limited in the embodiments of this application. In this way, the indication manner in the embodiments of this application should be understood as covering various methods that can enable a to-be-indicated party to learn of the to-be-indicated information.

In addition, the to-be-indicated information may have another equivalent form. For example, a row vector may be represented as a column vector; a matrix may be represented by using a transposed matrix of the matrix; the matrix may alternatively be represented in a form of a vector or an array; and the vector or the array may be formed by connecting row vectors or column vectors in the matrix. The technical solutions provided in the embodiments of this application should be understood as covering various forms. For example, some or all features in the embodiments of this application should be understood as covering various representations of the features.

The to-be-indicated information may be sent as a whole, or may be divided into a plurality of pieces of sub-information for separate sending. In addition, sending periodicities and/or sending occasions of the sub-information may be the same or may be different. A specific sending method is not limited in this application. The sending periodicities and/or the sending occasions of the sub-information may be predefined, for example, predefined according to a protocol, or may be configured by a transmit end device by sending configuration information to a receive end device. The configuration information may include, for example, but not limited to, one or a combination of at least two of radio resource control signaling, media access control (MAC) layer signaling, and physical layer signaling. The radio resource control signaling includes, for example, radio resource control (RRC) signaling. The MAC layer signaling includes, for example, a MAC control element (CE). The physical layer signaling includes, for example, DCI.

Second, the terms "first", "second", and various numbers in the following embodiments are merely used for differentiation for ease of description, and are not intended to limit the scope of the embodiments of this application. For example, the terms are used to distinguish between different preset correspondences.

Third, in the following embodiments, "being preset" may include "being indicated by the network device by using signaling or "being predefined", for example, "being defined in a protocol". The "predefinition" may be implemented in a manner in which corresponding code, a table, or other related indication information may be prestored in a device (for example, including a terminal device and a network device). A specific implementation of the "predefinition" is not limited in this application.

Fourth, "storage" in the embodiments of this application may be storage in one or more memories. The one or more memories may be separately disposed, or may be integrated into an encoder or a decoder, a processor, or a communications apparatus. Alternatively, some of the one or more memories may be separately disposed, and some of the one or more memories are integrated into a decoder, a processor, or a communications apparatus. A type of the memory may be a storage medium in any form, and this is not limited in this application.

Fifth, a "protocol" in the embodiments of this application may be a standard protocol in the communications field, for example, may include an LTE protocol, an NR protocol, and a related protocol applied to a future communications system. This is not limited in this application.

With reference to FIG. 1, the foregoing briefly describes a scenario in which the link failure recovery method provided in the embodiments of this application can be applied, and briefly introduces the basic concepts in the embodiments of this application. To further understand an improvement of the link failure recovery method provided in the embodiments of this application compared with a link failure recovery method specified in a current protocol, the following briefly describes the link failure recovery method specified in the current protocol with reference to FIG. 2.

Figure 2:
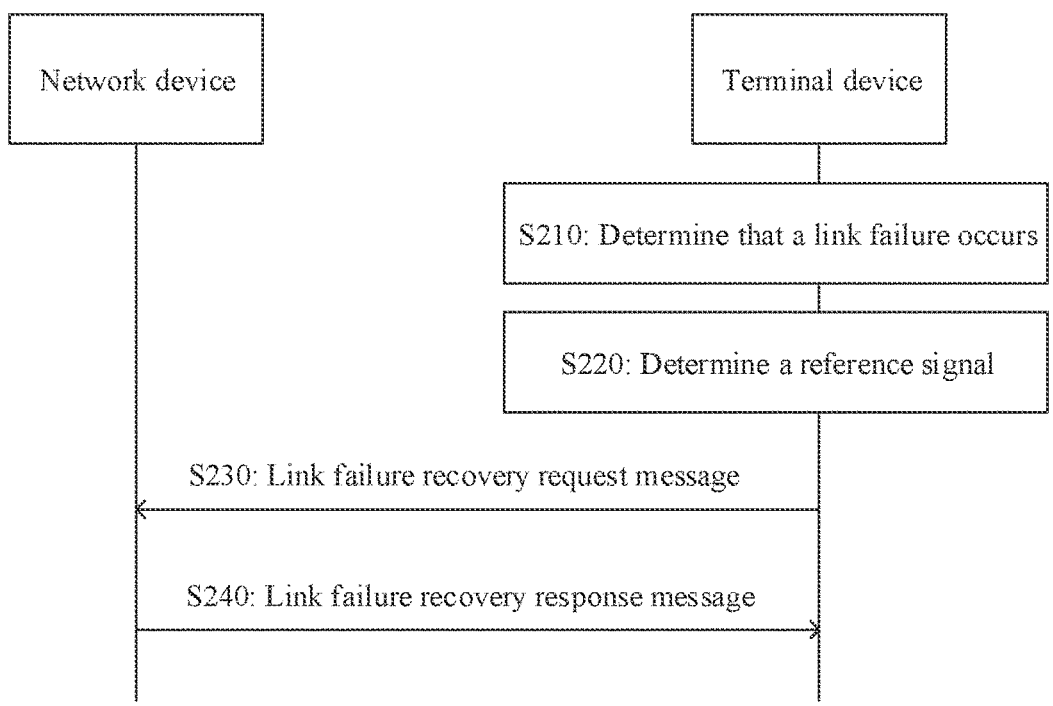
FIG. 2 is a schematic flowchart of link failure recovery.

FIG. 2 is a schematic flowchart of a link failure recovery method. The flowchart includes a network device and a terminal device.

The link failure recovery includes the following steps.

S210: The terminal device measures channel quality of a reference signal corresponding to a reference signal resource in a beam failure detection reference signal resource set (beam failure detection RS set), and determines that a link between the terminal device and the network device fails.

For example, when the terminal device determines that channel quality of reference signals corresponding to all or some of reference signal resources in a first reference signal resource set is less than or equal to a first preset threshold for W consecutive times, the terminal device may determine that a link that is between the terminal device and the network device and that corresponds to the first reference signal resource set fails.

It should be understood that, in this embodiment of this application, a manner in which the terminal device determines that the link in a cell between the terminal device and the network device fails is not limited to the foregoing example, and that the link between the terminal device and the network device fails may alternatively be determined in another determining manner. This is not limited in this application.

It should be further understood that, in this embodiment of this application, that the link in the cell between the terminal device and the network device fails may be referred to as that a link failure occurs in the cell for short, and the cell is a cell served by the network device.

S220: The terminal device identifies a reference signal resource in a second reference signal resource set. The reference signal resource is selected, so that the terminal device may perform link failure recovery based on the reference signal resource.

Optionally, channel quality of a reference signal corresponding to the identified reference signal resource is greater than or equal to a link failure recovery threshold. A process in which the terminal device identifies the reference signal corresponding to the reference signal resource may be understood as that the terminal device measures channel quality of a reference signal corresponding to a reference signal resource in the second reference signal resource set, and determines, from the second reference signal resource set, the reference signal resource (which may be referred to as a new identified beam or a new beam) corresponding to the reference signal whose channel quality is greater than or equal to the link failure recovery threshold.

It should be understood that, the reference signal resource selected by the terminal device from the second reference signal resource set may be referred to as a new reference signal resource or a new beam, and a name of the reference signal resource selected from the second reference signal resource set constitutes no limitation on the protection scope of this application.

S230: The terminal device sends a BFRQ message to the network device, where the BFRQ message is associated with the reference signal resource corresponding to the reference signal whose channel quality is greater than or equal to the link failure recovery threshold and identified in S220.

Optionally, the terminal device may notify the network device of the reference signal resource in an explicit manner.

For example, the terminal device explicitly reports an index of the reference signal resource or an identifier of the reference signal resource to the network device.

Optionally, the terminal device may notify the network device of the reference signal resource in an implicit manner.

For example, the network device preconfigures an association relationship between a plurality of uplink resources for sending the BFRQ message and a plurality of reference signal resources, and the terminal device selects an uplink resource for sending the BFRQ message, to implicitly notify the network device of the reference signal resource.

Further, the terminal device may further report at least one piece of information such as information about the reference signal resource or link failure identification information by using one or more BFRQ messages.

It should be understood that, in this embodiment of this application, the terminal device may send the BFRQ message to the network device, and perform, by using the network device, failure recovery of the link between the terminal device and the network device. Alternatively, the terminal device may send the BFRQ message to another network device, and perform, by using the another network device, failure recovery of the link between the terminal device and the network device. For example, the terminal device determines that a link between the terminal device and a network device #1 fails, the terminal device may send a BFRQ message to a network device #2, and the network device #2 notifies the network device #1 of the BFRQ message, so that the network device #1 learns that the link between the network device #1 and the terminal device fails, to perform link failure recovery. Alternatively, the network device serves a cell #1 and a cell #2, the terminal device determines that a link failure occurs in the cell #1, and the terminal device may send a BFRQ message to the network device through a link in the cell #2.

In NR, a BFRQ message of a PCell may be reported by using a PRACH resource. The network device configures one or more PRACH resources for a cell, and configures one reference signal resource associated with the PRACH resource, where the reference signal resource is a reference signal resource used for link failure recovery. The reference signal resource may be a reference signal resource in the second reference signal resource set configured by the network device. The terminal device determines the link failure, identifies the reference signal resource, and selects a PRACH resource associated with the reference signal resource to send a signal. In this way, the terminal device may implicitly indicate the information about the reference signal resource.

For example, an uplink resource set that is configured by the network device for a first cell and that is used to send a link failure request message of the first cell is referred to as a first uplink resource set. A quantity of PRACH resources included in the first uplink resource set is equal to a quantity of downlink reference signal resources in a reference signal resource set of the first cell. In other words, one PRACH resource is associated with one downlink reference signal resource. The terminal device identifies, from the reference signal resource set, a reference signal resource greater than or equal to the link failure recovery threshold, and sends the link failure recovery request message on a PRACH resource associated with the reference signal resource. Optionally, when there is an uplink and downlink reciprocity, a transmit beam used when the terminal device sends information on one PRACH resource is a transmit beam corresponding to a receive beam of a downlink reference signal resource associated with the PRACH resource. In other words, the terminal device may send the information on the PRACH resource by using the transmit beam corresponding to the receive beam. When there is no uplink and downlink reciprocity, in an optional implementation, one PRACH resource in the first uplink resource set is associated with one downlink reference signal resource and one uplink reference signal resource. The terminal device may determine, based on the determined PRACH resource associated with the downlink reference signal resource, the uplink reference signal resource associated with the PRACH resource, to send information on the PRACH resource by using a transmit beam of the uplink reference signal resource.

In NR, a BFRQ message of an SCell may be reported in one step. For example, the BFRQ message may be carried on a physical uplink shared channel (PUSCH) resource, or the BFRQ message may be carried on a PUCCH resource, and the BFRQ message may indicate identification information of a cell in which a link failure occurs and/or information about a reference signal resource.

The BFRQ message may alternatively be reported in two steps by using a BFRQ 1 and a BFRQ 2. The BFRQ 1 may be carried on a PUCCH resource or a PRACH resource, and the BFRQ 2 may be carried on a PUSCH resource or a PUCCH resource.

In a possible implementation, the BFRQ 1 indicates a link failure event, the BFRQ 2 indicates identification information of a cell in which a link failure occurs, and/or information about a reference signal resource.

In another possible implementation, the BFRQ 1 indicates a link failure event and/or identification information of a cell in which a link failure occurs, and the BFRQ 2 indicates information about a reference signal resource.

It should be understood that, the BFRQ 2 information is carried on a PUSCH resource, and it may be understood that the BFRQ message is reported by using a MAC-CE.

Optionally, for the PCell, a MAC layer of the terminal device maintains a link failure recovery timer (beam failure recovery timer) and a link failure recovery counter (beam failure recovery counter). The link failure recovery timer is used to control an entire time length of link failure recovery. The link failure recovery counter is used to limit a quantity of times that the terminal device sends a link failure recovery request. When the link failure recovery counter reaches a maximum value, the terminal device considers that the link failure recovery fails, and stops a link failure recovery process. A time length of recovery of the recovery timer and a count value of the recovery counter may be configured by the network device, or may be preset values. This is not limited in this application.

S240: The network device sends a BFRR message to the terminal device, and the terminal device receives the BFRR message.

Optionally, the BFRR may be DCI detected in a control resource set and a search space set. The control resource set and the search space set are a dedicated control resource set and a dedicated search space set that are configured by the network device for the terminal device, and used by a downlink control resource for the network device to send a response message of the link failure recovery request message after the terminal device sends the link failure request message. The BFRR may alternatively be in another form. This is not limited in this application.

It should be further understood that, in this embodiment of this application, a time sequence of S210 and S220 in the link failure recovery procedure is not limited. For example, the terminal device may first measure the channel quality of the reference signal corresponding to the reference signal resource in the second reference signal resource set configured by the network device, select the reference signal resource, and when determining that the link between the terminal device and the network device fails, perform subsequent steps by using the selected reference signal resource. That is, S210 may be performed before S220, S220 may be performed before S210, or S210 and S220 may be performed at the same time.

It should be further understood that, S240 is an optional step. For example, when the link recovery fails, the terminal device does not receive the BFRR message in S240.

When the BFRQ message is retransmitted, it can be learned from the descriptions of S230 in FIG. 2 that the BFRQ message is retransmitted in different manners for the SCell in NR. Specifically, the following describes, with reference to FIG. 3a and FIG. 3b, the manner of retransmitting the BFRQ message corresponding to the SCell.

Figure 3A:
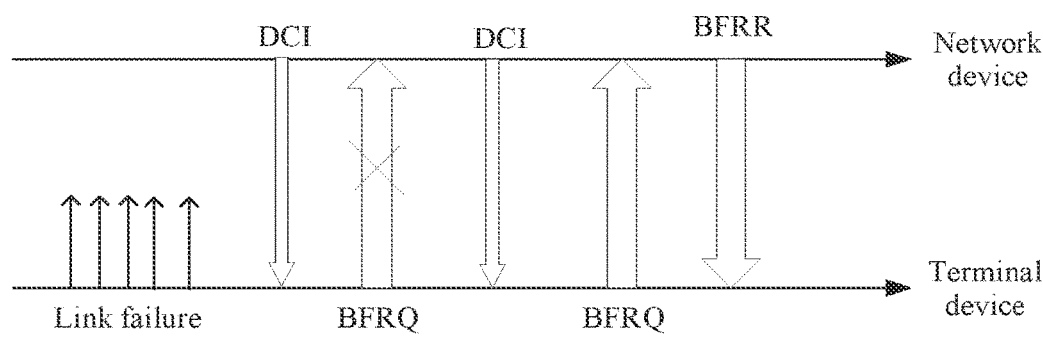
FIG. 3a and FIG. 3b are a schematic diagram of a manner of retransmitting a BFRQ message corresponding to an SCell in NR.
Figure 3B:
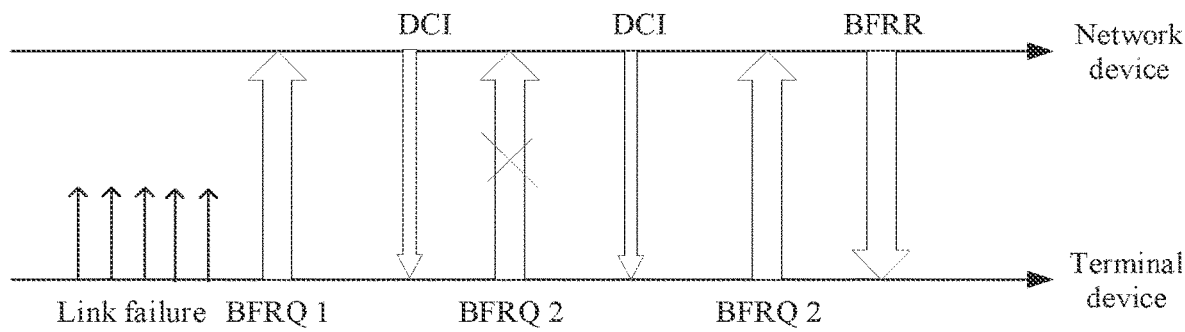

FIG. 3a and FIG. 3b are a schematic diagram of a manner of retransmitting a BFRQ message corresponding to an SCell in NR. The schematic diagram includes a network device and a terminal device.

Retransmission of the BFRQ message includes: The terminal device may include information about a cell in which a link failure occurs in the SCell in one MAC-CE, that is, the terminal device may send the information about the cell in which the link failure occurs to the network device by using one MAC-CE, as shown in FIG. 3a.

Alternatively, the terminal device may include information about a cell in which a link failure occurs in the SCell in two BFRQ messages (which are referred to as a BFRQ 1 and a BFRQ 2 for short in this embodiment of this application), where the BFRQ 2 is carried by using a MAC-CE, as shown in FIG. 3b.

Specifically, a BFRQ marked with "x" in FIG. 3a and FIG. 3b indicates that the BFRQ fails to be transmitted, for example, the first BFRQ in FIG. 3a and the first BFRQ 2 in FIG. 3b. If a BFRQ or a BFRQ 2 marked with "x" appears in another accompanying drawing, it also indicates that the BFRQ fails to be transmitted. Details are not described in this application.

A MAC-CE retransmission mechanism is specified in a current protocol. Whether to retransmit a MAC-CE and time at which the MAC-CE is retransmitted depend on scheduling by the network device. For example, if new data indicator (NDI) information in DCI sent by the network device is not flipped, it is considered that the MAC-CE is retransmitted. If the NDI in the DCI sent by the network device is flipped, it is considered that the MAC-CE is newly transmitted. Content of the retransmitted MAC-CE is the same as that of the initially transmitted MAC-CE.

It should be understood that, TCI reconfiguration shown in FIG. 3a and FIG. 3b refers to a subsequent resource configuration procedure after failure recovery of a link between the network device and the terminal device. This procedure is not limited in this application.

It can be learned from the descriptions in FIG. 2 and FIG. 3a and FIG. 3b that, when the BFRQ message needs to be retransmitted for reporting of the BFRQ message of the SCell in NR, because some or all information in the BFRQ message is carried by using a MAC-CE, but retransmission of the MAC-CE depends on scheduling by the network device, and a retransmission moment of the MAC-CE cannot be limited, fast retransmission of the BFRQ message cannot be ensured, and timeliness of the link failure recovery is affected.

To resolve a problem in BFRQ message transmission shown in FIG. 2 and/or BFRQ message retransmission shown in FIG. 3a and FIG. 3b, this application provides a link failure recovery method. Based on a retransmission mechanism in which a MAC-CE for carrying a link failure recovery request message is indicated, link failure recovery performance is improved. The following describes in detail, with reference to the accompanying drawings, the link failure recovery method provided in the embodiments of this application.

It should be understood that, the method provided in the embodiments of this application may be applied to a system in which communication is performed by using a multi-antenna technology, for example, the communications system 103 shown in FIG. 1c. The communications system may include at least one network device and at least one terminal device. The network device and the terminal device may communicate with each other by using the multi-antenna technology.

It should be further understood that, a specific structure of an entity for performing a method provided in the embodiments of this application is not particularly limited in the following embodiments, provided that the entity can run a program that records code of the method provided in the embodiments of this application to perform communication according to the method provided in the embodiments of this application. For example, the entity for performing the method provided in the embodiments of this application may be a terminal device, a network device, or a functional module that is in a terminal device or a network device and that can invoke and execute the program.

Without loss of generality, interaction between the network device and the terminal device is used as an example below to describe in detail the link failure recovery method provided in the embodiments of this application.

Figure 4A:
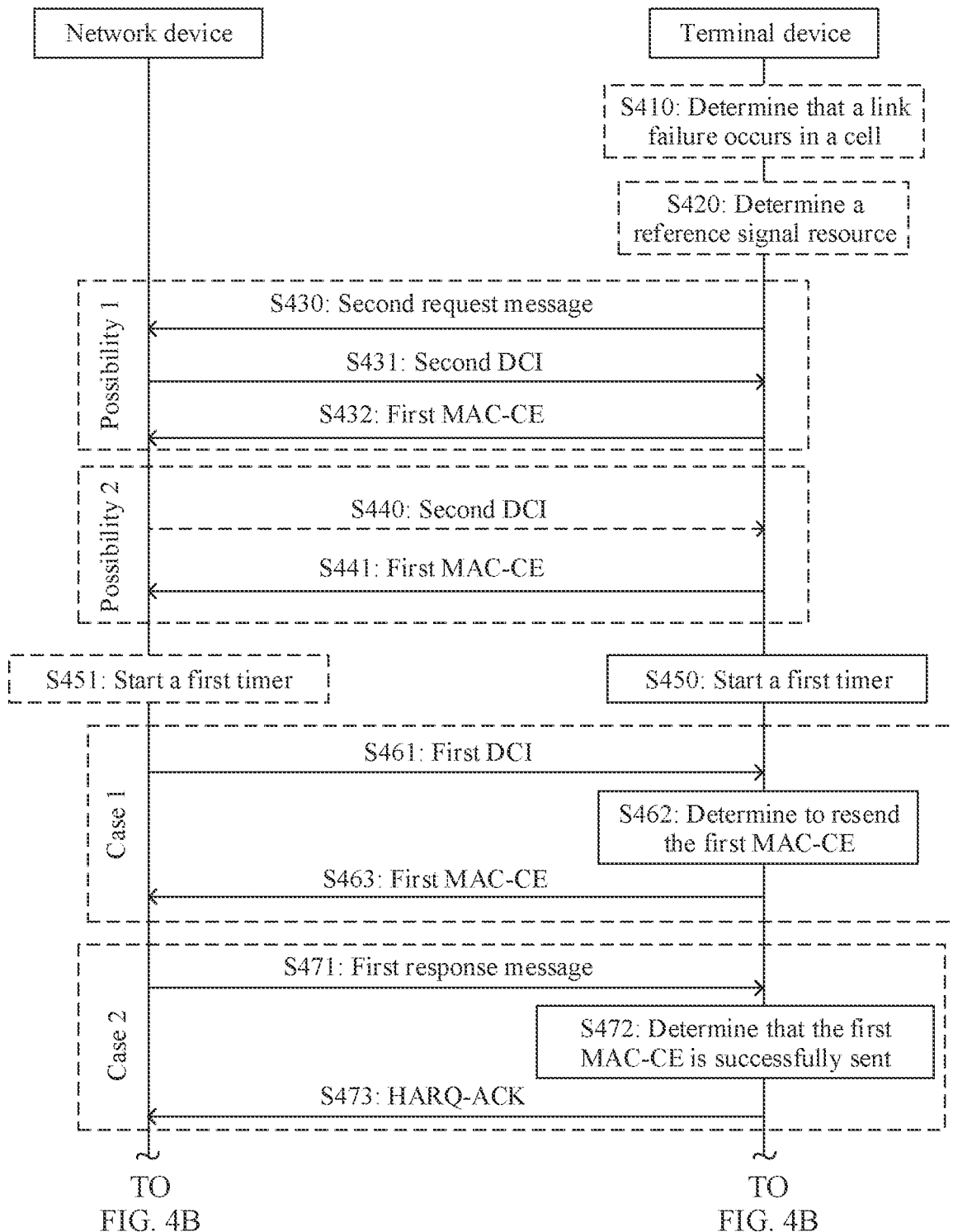
FIG. 4A and FIG. 4B are a schematic flowchart of a link failure recovery method according to an embodiment of this application.
Figure 4B:
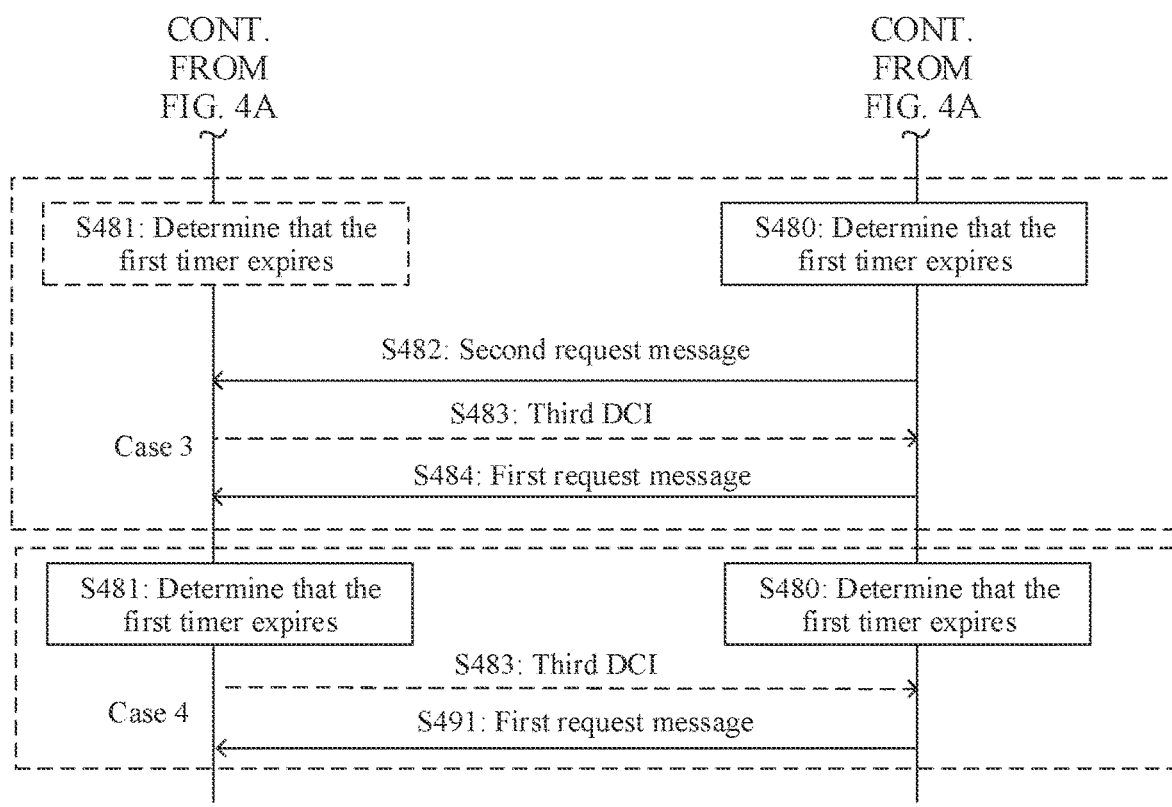

FIG. 4A and FIG. 4B are a schematic flowchart of a link failure recovery method according to an embodiment of this application. The flowchart includes a network device and a terminal device.

The link failure recovery method is applied to a case in which a link failure occurs in a cell, and specifically includes the following steps.

S410: The terminal device determines that a link failure occurs in a cell.

It should be understood that, in this embodiment of this application, the terminal device may determine whether a link failure occurs in at least one cell. Specifically, the terminal device determines, based on at least one first reference signal resource set, that the link failure occurs in the at least one cell, where there is a one-to-one correspondence between the at least one cell and the at least one first reference signal resource set. A manner in which the terminal device learns of the at least one first reference signal resource set is not limited in this embodiment of this application, for example, the network device explicitly or implicitly configures the at least one first reference signal resource set for the terminal device, as described above.

Specifically, the terminal device may determine, based on channel quality of a reference signal corresponding to a reference signal resource in a first reference signal resource set corresponding to a cell, whether a link failure occurs in the cell. For example, when channel quality of reference signals corresponding to some or all of reference signal resources in the first reference signal resource set corresponding to the cell satisfies a first preset condition, the link failure occurs in the cell.

Optionally, in this embodiment of this application, the terminal device may determine, by referring to a specification in a current protocol, whether a link failure occurs in a cell. For example, the first preset condition is that channel quality of reference signals corresponding to some or all of reference signal resources in a first reference signal resource set corresponding to a first cell is lower than a first preset threshold, and the first preset threshold is a value configured by the network device, or the first preset threshold is a predefined value in a protocol, or the first preset threshold is a radio link failure out-of-synchronization threshold.

For ease of understanding, the following describes, by using a specific embodiment, how the terminal device determines that the link failure occurs in the cell.

For example, the first preset threshold is a value (for example, the value is X) configured by the network device for the terminal device by using higher layer signaling. The network device serves two cells (the first cell and a second cell), and the network device configures two first reference signal resource sets (a first reference signal resource set #1 and a first reference signal resource set #2) for the terminal device. The first reference signal resource set #1 corresponds to the first cell, the first reference signal resource set #2 corresponds to the second cell, the first reference signal resource set #1 includes two reference signal resources (a reference signal resource 1 #1 and a reference signal resource 1 #2), and the first reference signal resource set #2 includes three reference signal resources (a reference signal resource 2 #1 to a reference signal resource 2 #3). The terminal device determines that a link failure occurs in the first cell, which includes: Channel quality information of reference signals corresponding to the reference signal resource 1 #1 and the reference signal resource 1 #2 is lower than X for P consecutive times.

Optionally, the first preset condition may alternatively be another condition preset by the network device or a protocol. For example, the first preset condition is that a sum of channel quality of reference signals corresponding to some or all of the reference signal resources in the first reference signal resource set corresponding to the cell in which the link failure occurs is lower than a value.

It should be understood that, a specific form of the first preset condition is not limited in this application. The first preset condition may still be that channel quality of reference signals corresponding to some or all of reference signal resources in a first reference signal resource set is lower than the first preset threshold, which is specified in the current protocol, or may be a condition that can be used to determine whether a link failure occurs in a cell in a future communications technology.

S420: The terminal device determines a reference signal resource.

Before or after the terminal device determines that the link failure occurs in the cell, or when the terminal device determines that the link failure occurs in the cell, the terminal device determines the reference signal resource from a second reference signal resource set corresponding to the cell in which the link failure occurs. The reference signal resource is a reference signal resource that satisfies a second preset condition in the second reference signal resource set, and the second reference signal resource set is a preset beam recovery reference signal resource set used for link recovery of the cell.

Optionally, the second reference signal resource set is a beam recovery reference signal resource set configured by the network device for the terminal device and used to recover a link between the terminal device and the network device.

Optionally, the second reference signal resource set is a preset reference signal resource set. For example, the second reference signal resource set is a reference signal resource set used for BM, or the second reference signal resource set is a reference signal set used for RRM measurement, or the second reference signal resource set is a reference signal resource set that reuses another function.

That is, the second reference signal resource set in this embodiment of this application may be a beam recovery reference signal resource set configured by the network device for the terminal device and dedicated to recovering the link between the terminal device and the network device, or may reuse an existing reference signal resource set. Alternatively, some reference signal resources in the second reference signal resource set are beam recovery reference signal resources configured by the network device for the terminal device and dedicated to recovering the link between the terminal device and the network device, and the other reference signal resources in the second reference signal resource set reuse existing reference signal resources. A specific composition of the second reference signal resource set is not limited in this application.

Optionally, in this embodiment of this application, for a procedure in which the terminal device selects the reference signal resource from the second reference signal resource set, refer to a specification in the current protocol. For example, the second preset condition is that channel quality of a reference signal corresponding to a reference signal resource in a second reference signal resource set corresponding to a cell is higher than a second preset threshold, and the second preset threshold is a value configured by the network device, or the second preset threshold is a predefined value in the protocol, or the second preset threshold is a threshold used for mobility measurement.

For ease of understanding, the following describes, by using a specific embodiment, how the terminal device determines the reference signal resource from the second reference signal resource set.

For example, the second preset threshold is a value (for example, the value is Q) configured by the network device for the terminal device by using higher layer signaling. The network device serves two cells (the first cell and the second cell), and the network device configures two second reference signal resource sets (a second reference signal resource set #1 and a second reference signal resource set #2) for the terminal device. The second reference signal resource set #1 corresponds to the first cell, the second reference signal resource set #2 corresponds to the second cell, the second reference signal resource set #1 includes 10 reference signal resources (a reference signal resource 1 #1 to a reference signal resource 1 #10), and the second reference signal resource set #2 includes 10 reference signal resources (a reference signal resource 2 #1 to a reference signal resource 2 #10). The terminal device determines that the reference signal resource 1 #1 in the second reference signal resource set #1 is a reference signal resource, which includes: Channel quality information of a reference signal corresponding to the reference signal resource 1 #1 is higher than Q.

Optionally, the second preset condition may alternatively be another condition preset by the network device or the protocol. For example, the second preset condition is that a value obtained by subtracting a value from channel quality of a reference signal corresponding to a reference signal resource in a second reference signal resource set corresponding to a cell satisfies a specific condition. Details are not described herein.

It should be understood that, a specific form of the second preset condition is not limited in this application. The second preset condition may still be that channel quality of a reference signal of a reference signal resource in a second reference signal resource set is higher than the second preset threshold, which is specified in the current protocol, or may be a condition that can be used to determine a reference signal resource from a second reference signal resource set in a future communications technology.

It should be further understood that, a second reference signal resource set corresponding to a cell may have a plurality of reference signal resources that satisfy the second preset condition, and the terminal device may select the reference signal resource from the plurality of reference signal resources. A specific selection form may be random selection, or may be selection, from the plurality of reference signal resources, of a reference signal resource corresponding to a reference signal whose channel quality is the highest, as the reference signal resource, or may be another selection manner. Examples are not provided for description herein one by one.

It should be further understood that, retransmission of a BFRQ message is mainly involved in the link failure recovery method provided in this embodiment of this application, and how to determine the link failure and how to select the reference signal resource are not limited. S410 and S420 are merely examples to describe that the link failure may be determined based on the specification in the current protocol, and can constitute no limitation on the protection scope of this application. For example, this application may also be applied to a scenario in which that a link failure occurs in a cell is determined based on another possible solution in a future communications system. Examples are not provided for description herein one by one.

Specifically, after determining that the link failure occurs in the cell, the terminal device needs to send a BFRQ message to the network device, to notify the network device of the link failure and information about the cell in which the link failure occurs. The terminal device reports the BFRQ message to the network device in the following two possibilities:

Possibility 1:

The terminal device may jointly feed back the BFRQ message by using a PUCCH and a MAC-CE. For example, after determining that the link failure occurs in the cell, the terminal device sends a second request message to the network device on a fourth resource, that is, notifies the network device that a link failure event occurs, where the second request message is used to indicate the link failure. That is, the method procedure shown in FIG. 4A and FIG. 4B further includes: S430: The terminal device sends the second request message to the network device. The fourth resource may be a resource of a primary cell (PCell) or a resource of a primary secondary cell (PSCell).

Specifically, after the terminal device notifies, by using the second request message, the network device that the link failure event occurs, the network device may allocate an uplink resource to the terminal device, so that the terminal device may report the information about the cell in which the link failure occurs. In this case, the method procedure shown in FIG. 4A and FIG. 4B further includes: S431; The network device sends second DCI to the terminal device.

The second DCI is used to indicate a first resource, the first resource includes a PUSCH resource, and the first resource is used to send a first MAC-CE. That is, the terminal device may send the first MAC-CE on the first resource scheduled by using the second DCI. In this case, the method procedure shown in FIG. 4A and FIG. 4B further includes: S432: The terminal device sends the first MAC-CE to the network device.

The first MAC-CE is used for a link failure recovery request, and the first MAC-CE includes the information about the cell in which the link failure occurs. It should be understood that, when the terminal device sends the second request message to the network device, the first MAC-CE is used to indicate the information about the cell in which the link failure occurs, the information about the cell in which the link failure occurs may be identification information of the cell in which the link failure occurs and/or information about a reference signal resource, the reference signal resource is a reference signal resource that satisfies the second preset condition in the second reference signal resource set, and the identification information of the cell in which the link failure occurs may be an identifier of the cell in which the link failure occurs, or the identification information of the cell in which the link failure occurs may be an index of the cell in which the link failure occurs, or the identification information of the cell in which the link failure occurs may be other possible information used to identify the cell in which the link failure occurs.

In a possible implementation, when the terminal device does not identify the reference signal resource (for example, there is no reference signal resource that satisfies the second preset condition in the second reference signal resource set, or the network device does not indicate the second reference signal resource set), the terminal device does not send the information about the reference signal resource, or sends status indication information indicating that there is no information about the reference signal resource. In this manner, the information about the cell in which the link failure occurs does not include the information about the reference signal resource, but may include indication information, and the indication information is used to indicate that the information about the reference signal resource is not included.

For example, the second request message indicates that a link failure occurs in Y cells out of X cells, X is a positive integer, and the first MAC-CE indicates cell identification information of the Y cells and/or information about Y reference signal resources used for link recovery of the Y cells. X is a positive integer, and Y is a positive integer less than or equal to X.

Specifically, the first MAC-CE may be the foregoing BFRQ 2, and the second request message may be the foregoing BFRQ 1.

It should be understood that, the second request message may also be referred to as a scheduling request message, or the second request message and a scheduling request message use a same format.

It should be further understood that, a response message of the second request message may be the foregoing second DCI. For example, after receiving the second request message, the network device may further send the response message of the second request message. The response message of the second request message may be used to indicate the first resource allocated to the terminal device, that is, the network device allocates a resource to the terminal device. The first resource may be an aperiodic resource (or referred to as a dynamic resource). In this method, the network device determines, depending on whether there is a cell in which a link failure occurs in a current network (which is determined by using the second request message), whether to allocate the first resource. If the network device receives the second request message, the network device can learn that there is a cell in which a link failure occurs in the current network, and the network device may dynamically allocate the first resource, so that the terminal device further reports cells in which a link failure occurs, and/or reports information about new links (information about reference signal resources) of the cells requiring link failure recovery. Because the link failure event is an unexpected event, in this method, a periodic resource for sending a link failure recovery request message does not need to be reserved in advance, so that resource overheads can be effectively reduced.

It should be further understood that, the manner shown in the possibility 1 in which the terminal device feeds back the BFRQ message may also be referred to as two-step BFRQ message transmission.

Possibility 2:

The terminal device may feed back the BFRQ message by using a PUSCH, that is, feed back the BFRQ message in one step. The method procedure shown in FIG. 4A and FIG. 4B includes S440 (in which the network device sends second DCI to the terminal device) and S441 in which the terminal device sends a first MAC-CE to the network device. Alternatively, the method procedure in FIG. 4A and FIG. 4B includes S441 but does not include S440. The second DCI sent by the network device to the terminal device in S440 is similar to the second DCI sent by the network device to the terminal device in S431 in the possibility 1, and is used to indicate a first resource, the first resource includes a PUSCH resource, and the first resource is used to send the first MAC-CE. That is, the terminal device may send the first MAC-CE on the first resource scheduled by using the second DCI. A difference from the second DCI sent by the network device to the terminal device in S431 lies in that: The second DCI sent by the network device to the terminal device in S440 is not a response message of the second request message sent by the terminal device to the network device in S430, but a message used by the network device to allocate an uplink resource to the terminal device. Alternatively, the network device does not send the second DCI, and the terminal device directly sends the first MAC-CE on a preconfigured PUSCH resource (a semi-persistent or static resource).

The first MAC-CE in the possibility 2 is similar to that in the foregoing possibility 1, and details are not described herein again.

It should be understood that, in the possibility 1 and the possibility 2, the first resource for sending the first MAC-CE may be a PUSCH resource. In the possibility 1 and the possibility 2, the reference signal resource may be a CSI-RS resource or an SSB resource.

In a possible implementation, information, carried in the first MAC-CE sent by the terminal device to the network device, about the at least one cell in which the link failure occurs is an identifier of each of the at least one cell.

For example, if the terminal device determines that a link failure occurs in three cells, and identifiers of the three cells are respectively (a cell #1, a cell #2, and a cell #3), the first MAC-CE carries the cell #1, the cell #2, and the cell #3. Specifically, the first MAC-CE may indicate, by using a bitmap, the identifier of the cell in which the link failure occurs. For example, if five cells (a cell #1, a cell #2, a cell #3, a cell #4, and a cell #5) are configured for the terminal device, it is determined that a link failure occurs in three cells, and identifiers of the three cells are respectively (the cell #1, the cell #2, and the cell #3), the first MAC-CE carries 5-bit information being 11100. The information is used to indicate the identifier of the cell in which the link failure occurs, an $i^{th}$ status bit corresponds to an $i^{th}$ cell, and when the $i^{th}$ status bit is 1, it indicates that a link failure occurs in the cell corresponding to the status bit, or when the $i^{th}$ status bit is 0, it indicates that no link failure occurs in the cell corresponding to the status bit.

In another possible implementation, information, carried in the first MAC-CE sent by the terminal device to the network device, about the at least one cell is information about a reference signal resource corresponding to each of the at least one cell.

For example, the terminal device determines that a link failure occurs in three cells, and the three cells correspond to three second reference signal resource sets (a second reference signal resource set #1 to a second reference signal resource set #3). After determining that the link failure occurs in the three cells, the terminal device separately determines three reference signal resources from the second reference signal resource set #1 to the second reference signal resource set #3. If indexes of the three reference signal resources are a reference signal resource #1, a reference signal resource #2, and a reference signal resource #3, the first MAC-CE carries the reference signal resource #1, the reference signal resource #2, and the reference signal resource #3.

In another possible implementation, information, carried in the first MAC-CE sent by the terminal device to the network device, about the at least one cell is an identifier of each of the at least one cell and information about a reference signal resource corresponding to each cell.

For ease of description, in this embodiment of this application, an example in which the terminal device determines that a link failure occurs in a cell, and notifies the network device of the link failure of the cell is used for description. In this case, the first MAC-CE carries an identifier of the cell in which the link failure occurs and/or information about a reference signal corresponding to the cell in which the link failure occurs. The information about the reference signal resource includes an index of the reference signal resource and/or channel quality of a reference signal corresponding to the reference signal resource (for example, RSRP, a SINR, RSRQ, or a CQI of the reference signal corresponding to the reference signal resource).

It should be noted that, to avoid impact on timeliness of link failure recovery when fast retransmission of the BFRQ message cannot be ensured because retransmission of the first MAC-CE completely depends on scheduling by the network device, a first timer is set in this embodiment of this application. The first timer is used to control retransmission time of the second request message and the first MAC-CE, or is used to control retransmission time of the first MAC-CE. In this case, the method procedure shown in FIG. 4A and FIG. 4B further includes S450: The terminal device starts the first timer. Optionally, the method procedure shown in FIG. 4A and FIG. 4B may further include S451: The network device starts the first timer.

Specifically, the terminal device may start the first timer K time units after the terminal device sends the first MAC-CE to the network device, where K is a value greater than or equal to 0. That is, the terminal device performs S450 K time units after S432 is performed in the possibility 1, or the terminal device performs S450 K time units after S441 is performed in the possibility 2.

In a possible implementation, the terminal device starts the first timer at a moment at which the first MAC-CE is sent.

In another possible implementation, the terminal device starts the first timer after sending the first MAC-CE.

It should be further understood that, in this application, the first timer is not necessarily limited to being started the K time units after the first MAC-CE is sent. In some possible cases, the first timer may be started K time units before the first MAC-CE is sent. For example, when the terminal device reports the link failure request message in two steps, the terminal device may start the first timer after sending link failure event indication information (the second request message, the PUCCH) but before sending the first MAC-CE.

Specifically, the network device may start the first timer K time units after the terminal device sends the second DCI, or the network device may start the first timer K time units after the first MAC-CE is detected, or the network device may start the first timer K time units before the first MAC-CE starts to be detected. For example, when the terminal device reports the link failure request message in two steps, the network device may start the first timer after receiving link failure event indication information (the second request message, the PUCCH) but before starting to detect the first MAC-CE.

Further, after the terminal device starts the first timer, the terminal device detects, within a running period of the first timer, the first DCI used to indicate to retransmit the first MAC-CE or a first response message indicating that the first MAC-CE is successfully transmitted. The first DCI is used to indicate a third resource for the terminal device to resend the first MAC-CE to the network device, and the first response message is used to indicate that the network device successfully receives the first MAC-CE.

Optionally, the third resource is the foregoing first resource, that is, the network device indicates the terminal device to retransmit the first MAC-CE on a resource for transmitting the first MAC-CE for the first time; or
 optionally, the third resource is different from the foregoing first resource, that is, the network device indicates the terminal device to retransmit the first MAC-CE on a resource different from a resource for transmitting the first MAC-CE for the first time, so that a case in which the first MAC-CE needs to be retransmitted due to quality of the first resource can be avoided.

Similarly, after starting the first timer, the network device detects the first MAC-CE within the running period of the first timer, and determines, depending on whether the first MAC-CE is received during the running period of the first timer, to send the first DCI or the first response message, where the first DCI is used to indicate to resend the first MAC-CE, and the first response message is used to indicate that the first MAC-CE is successfully transmitted.

Specifically, there are the following two cases for a specific execution procedure performed by the network device within the running period of the first timer:
Case 1:
 When the network device does not receive the first MAC-CE during the running period of the first timer, the network device sends the first DCI, and restarts to detect the first MAC-CE. That is, the method procedure shown in FIG. 4A and FIG. 4B further includes: S461: The network device sends the first DCI.

Optionally, the network device resets the first timer K time units after the first MAC-CE is re-detected, where K is a value greater than or equal to 0.
Case 2:
 When the network device receives the first MAC-CE within the running period of the first timer, the network device sends the first response message. That is, the method procedure shown in FIG. 4A and FIG. 4B further includes: S471; The network device sends the first response message.
 Alternatively,
  when a hybrid automatic repeat request-acknowledgement (HARQ-ACK) of the first response message is received, the method procedure shown in FIG. 4A and FIG. 4B further includes: S473: The network device receives the HARQ-ACK of the first response message, and the network device stops the first timer.

Specifically, there are the following two cases for a specific execution procedure performed by the network device when the first timer expires:
Case 3:
 When the first timer expires, third DCI is sent.
 The third DCI is used to indicate a second resource for carrying the first request message, the first request message is the first MAC-CE, or the first request message is a second MAC-CE, and the second MAC-CE includes the information about the at least one cell in which the link failure occurs. That is, the method procedure shown in FIG. 4A and FIG. 4B may further include: S481: The network device determines that the first timer expires. S483: The network device sends the third DCI.

Optionally, before sending the third DCI, the network device receives a second request message, where the second request message is used to indicate the link failure; and sends the third DCI based on the second request message.

Specifically, there are the following two cases for a specific execution procedure performed by the terminal device within the running period of the first timer:
Case 1:
 If the terminal device receives, within the running period of the first timer, the first DCI that is sent by the network device and that indicates to retransmit the first MAC-CE, the terminal device resends the first MAC-CE to the network device. That is, the method procedure shown in FIG. 4A and FIG. 4B further includes S461: The terminal device receives the first DCI. S462: The terminal device determines to retransmit the first MAC-CE. S463: The terminal device resends the first MAC-CE to the network device.

Figure 5:
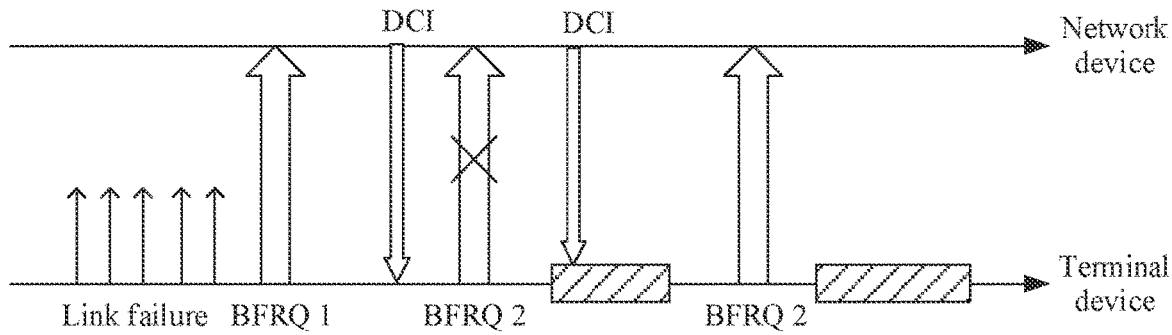
FIG. 5 is a schematic diagram of retransmitting a first MAC-CE according to an embodiment of this application.

Specifically, in the case shown in the case 1, retransmission of the first MAC-CE by the terminal device in the possibility 1 is shown in FIG. 5. FIG. 5 is a schematic diagram of retransmitting the first MAC-CE according to an embodiment of this application.

Figure 6:
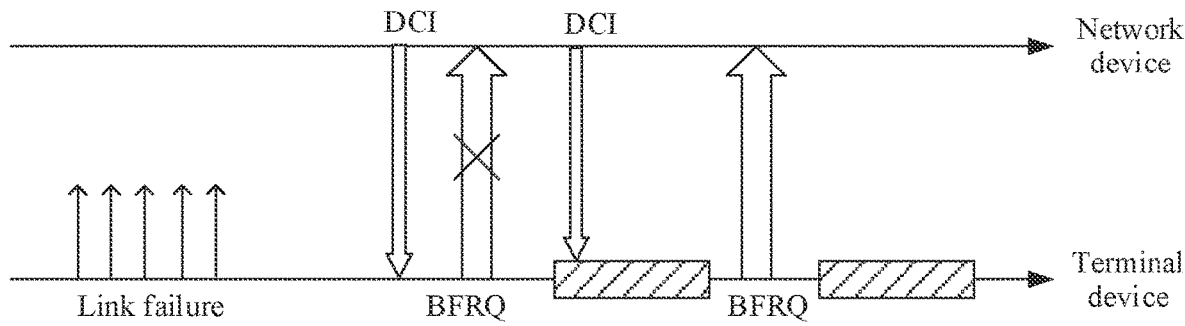
FIG. 6 is another schematic diagram of retransmitting a first MAC-CE according to an embodiment of this application.

Specifically, in the case shown in the case 1, retransmission of the first MAC-CE by the terminal device in the possibility 2 is shown in FIG. 6. FIG. 6 is another schematic diagram of retransmitting the first MAC-CE according to an embodiment of this application.

It should be understood that, FIG. 5 and FIG. 6 are merely examples for describing retransmission of the first MAC-CE, and constitute no limitation on the protection scope of this application. For example, in FIG. 5 and FIG. 6, after the terminal device receives the first DCI, a moment at which the first MAC-CE is retransmitted is not necessarily a moment shown in the figures.

It should be further understood that, that the first DCI can indicate to resend the first MAC-CE may be understood as that the first DCI and the second DCI for indicating the first resource have a same HARQ process identifier, and the first DCI and the second DCI have a same NDI. That is, the terminal device may determine, based on a relationship between HARQ process identifiers in the first DCI and the second DCI and a relationship between NDIs in the first DCI and the second DCI, to retransmit the first MAC-CE.

Optionally, the terminal device resets the first timer K time units after the first request message is resent to the network device, where K is a value greater than or equal to 0.
Case 2:
 If the terminal device receives, within the running period of the first timer, the first response message sent by the network device, the terminal device stops the first timer, and the terminal device determines that the information about the cell in which the link failure occurs is successfully fed back. That is, the method procedure shown in FIG. 4A and FIG. 4B further includes S471: The terminal device receives the first response message. S472: The terminal device determines that the first MAC-CE is successfully sent. The method procedure shown in FIG. 4A and FIG. 4B may further include: S473: The terminal device sends the HARQ-ACK of the first response message to the network device, to notify the network device that the first response message is successfully received.

Figure 7:
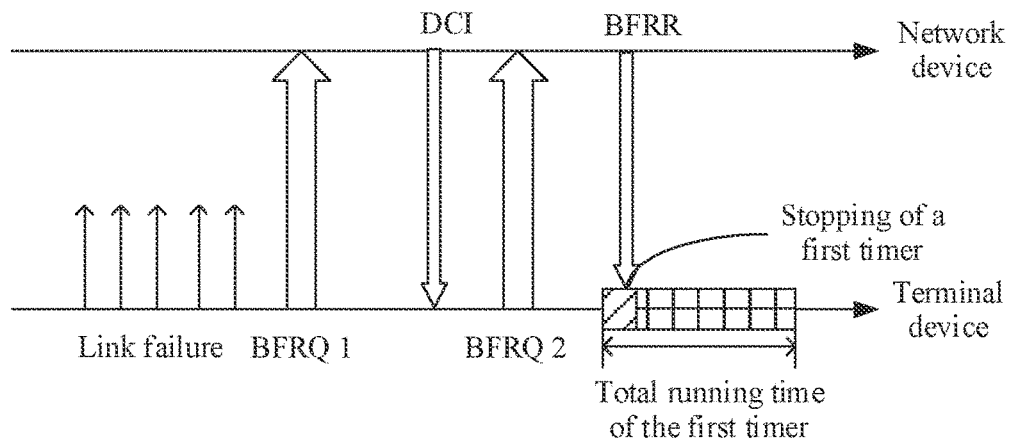
FIG. 7 is a schematic diagram of stopping a first timer according to an embodiment of this application.

Specifically, in the case shown in the case 2, stopping of the first timer by the terminal device in the possibility 1 is shown in FIG. 7. FIG. 7 is a schematic diagram of stopping the first timer according to an embodiment of this application.

Figure 8:
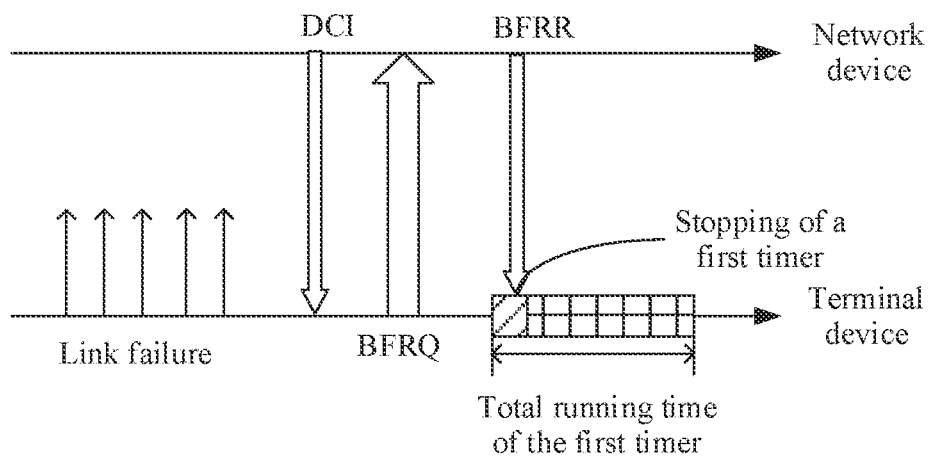
FIG. 8 is another schematic diagram of stopping a first timer according to an embodiment of this application.

Specifically, in the case shown in the case 2, stopping of the first timer by the terminal device in the possibility 2 is shown in FIG. 8. FIG. 8 is another schematic diagram of stopping the first timer according to an embodiment of this application.

Specifically, the first response message may be any one of the following signaling:

fourth DCI, a physical downlink control channel (PDCCH) transmission configuration indicator (TCI) of the cell in which the link failure occurs, DCI in a dedicated search space set, DCI in a dedicated control resource set, or DCI scrambled by using a dedicated radio network temporary identifier RNTI, where the fourth DCI is used to indicate a downlink resource, or the fourth DCI and the second DCI have a same hybrid automatic repeat request process identifier HARQ process identifier and different NDIs. The CRC of the DCI in the dedicated control resource set and/or the dedicated search space set may be scrambled by using a cell C-RNTI or an MCS-C-RNTI.

The foregoing describes, in detail with reference to the case 1 and the case 2, the operation performed by the terminal device within the running period of the first timer. The following describes, in detail with reference to a case 3 and a case 4, an operation performed by the terminal device when the first timer expires.

Specifically, the first request message is sent when the first timer expires, where the first request message is the first MAC-CE, or the first request message is the second MAC-CE, and the second MAC-CE includes the information about the at least one cell in which the link failure occurs.

It should be understood that, the information about the at least one cell in which the link failure occurs may include the information, included in the first MAC-CE, about the cell in which the link failure occurs. For example, if the terminal device determines that the link failure occurs in the first cell, the first MAC-CE includes information about the first cell, and the information about the at least one cell in which the link failure occurs includes the information about the first cell.

Specifically, the information about the cell in which the link failure occurs includes the identification information of the cell, or the information about the cell in which the link failure occurs includes the information about the reference signal resource, or the information about the cell in which the link failure occurs includes the information about the reference signal resource and the identification information of the cell. The information about the reference signal resource is used for link recovery of the cell in which the link failure occurs, and the information about the reference signal resource includes a resource index of the reference signal resource and/or channel quality information of a reference signal corresponding to the reference signal resource.

Based on a difference between information about cells in which a link failure occurs, the first MAC-CE and the second MAC-CE may have the following differences:

(1) A quantity of identifiers of cells that are included in the first MAC-CE is different from a quantity of identifiers of cells that are included in the second MAC-CE. For example, the first MAC-CE includes an identifier of the first cell, and the second MAC-CE includes the identifier of the first cell and an identifier of another cell in which a link failure occurs. That is, the second MAC-CE may include identifiers of a plurality of cells in which a link failure occurs. In this way, the network device learns, based on the second MAC-CE, that the link failure occurs in the plurality of cells.

(2) A quantity of information about reference signal resources that is included in the first MAC-CE is different from a quantity of information about reference signal resources that is included in the second MAC-CE. For example, the first MAC-CE includes information about a reference signal resource corresponding to the first cell, and the second MAC-CE includes the information about the reference signal resource corresponding to the first cell and information about a reference signal resource corresponding to another cell in which a link failure occurs. That is, the second MAC-CE may include information about reference signal resources corresponding to a plurality of cells in which a link failure occurs. In this way, the network device learns, based on the second MAC-CE, of the reference signal resources used for link recovery of the plurality of cells in which the link failure occurs.

(3) Information about a reference signal resource that is included in the first MAC-CE is different from information about a reference signal resource that is included in the second MAC-CE. For example, the first MAC-CE includes information about a reference signal resource corresponding to the first cell, and the second MAC-CE includes information about a second reference signal resource corresponding to the first cell. That is, the second MAC-CE may include information about another reference signal resource corresponding to the first cell. In this way, a case in which link recovery of a cell in which a link failure occurs fails due to a problem of a reference signal resource is avoided.

Further, resources used by the terminal device to transmit the first MAC-CE and the first request message may be different. For example, the first MAC-CE is sent on the first resource, the first request message is sent on the second resource, and cells in which the first resource and the second resource are located are different. In this way, a case in which the terminal device fails to resend the MAC-CE in the cell in which the first resource is located due to a quality problem of the first resource can be avoided.

It should be understood that, when the first resource and the second resource are different, the network device may indicate different transmission resources by using DCI. Specifically, when the first timer expires, the network device sends the third DCI, where the third DCI is used to indicate the second resource for carrying the first request message. That is, the method procedure shown in FIG. 4A and FIG. 4B further includes S483: The network device sends the third DCI to the terminal device.

Case 3:

When the terminal device determines the first timer expires, and before the terminal device sends the first request message, the method further includes: sending a second request message when the first timer expires, where the second request message is used to indicate the link failure.

In a possible implementation, if the terminal device reports the BFRQ message in a one-step reporting form before starting the first timer, the sending a second request message when the first timer expires is sending the second request message for the first time. This may be understood that a form of reporting the BFRQ message by the terminal device changes from the one-step reporting form to a two-step reporting form.

In another possible implementation, if the terminal device reports the BFRQ message in a two-step reporting form before starting the timer, before the sending a first MAC-CE, the method further includes: sending the second request message. That is, the sending a second request message when the first timer expires may be resending the second request message. That is, the terminal device resends the second request message and the first MAC-CE to the network device. That is, the method procedure shown in FIG. 4A and FIG. 4B further includes S480: The terminal device determines that the first timer expires. S482: The terminal device sends the second request message. S484: The terminal device sends the first request message.

Figure 9:
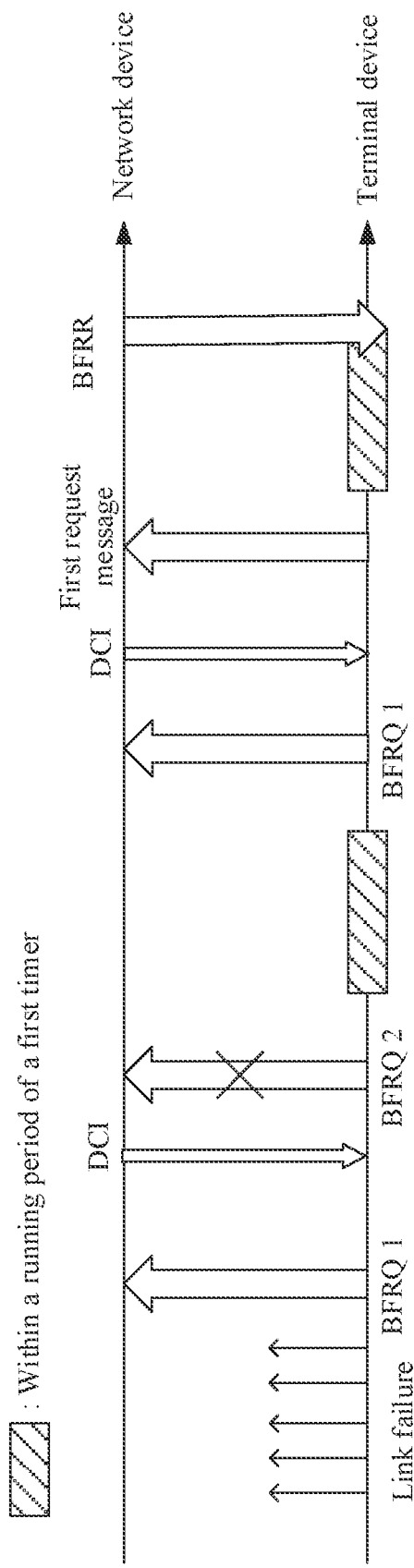
FIG. 9 is a schematic diagram of sending a first request message according to an embodiment of this application.

Specifically, in the case shown in the case 3, sending of the first request message by the terminal device is shown in FIG. 9. FIG. 9 is a schematic diagram of sending the first request message according to an embodiment of this application. In the schematic diagram shown in FIG. 9, an uplink resource for sending the first request message and an uplink resource for sending the first MAC-CE may be located in different cells or a same cell. When the first MAC-CE and the first request message are separately sent on resources of different cells, a case in which the first request message still fails to be sent on a resource of the cell in which the resource for sending the first MAC-CE is located due to a quality/link problem of the cell can be avoided.

Optionally, the second request message is carried on a physical uplink control channel (PUCCH), or the second request message is carried on a physical random access channel (PRACH).

Specifically, the PRACH may be a resource used for link failure recovery of the primary cell or the primary secondary cell.

Case 4:

The terminal device determines that the first timer expires, and the terminal device resends the first MAC-CE to the network device for the possibility 2. That is, the method procedure shown in FIG. 4A and FIG. 4B further includes: S480: The terminal device determines that the first timer expires. S491: The terminal device sends the first request message.

Figure 10:
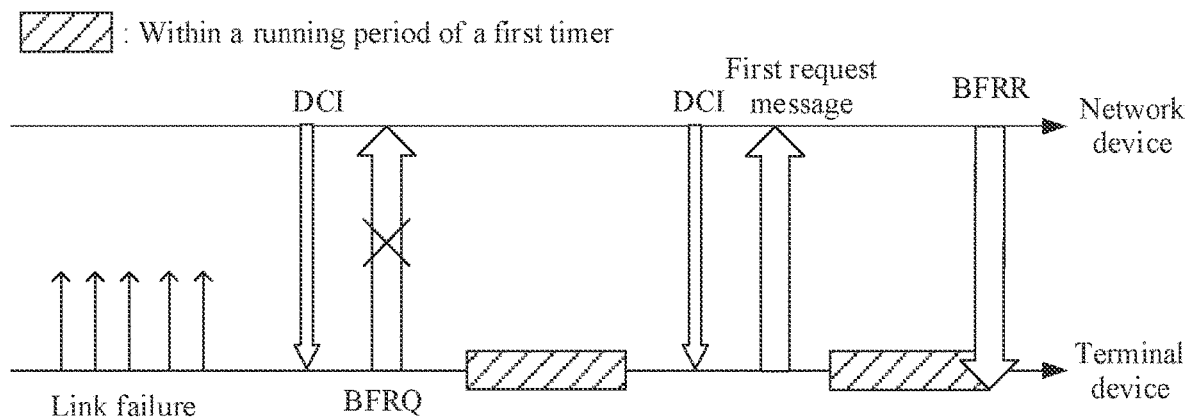
FIG. 10 is another schematic diagram of sending a first request message according to an embodiment of this application.

Specifically, in the case shown in the case 4, sending of the first request message by the terminal device is shown in FIG. 10. FIG. 10 is another schematic diagram of sending the first request message according to an embodiment of this application. A difference from sending of the first request message shown in FIG. 9 lies in that: In FIG. 10, the first request message is sent based on a scenario in which the BFRQ is reported in one step. It should be understood that, similar to what is shown in FIG. 9, an uplink resource for sending the first request message and an uplink resource for sending the first MAC-CE may be located in different cells or a same cell. When the first MAC-CE and the first request message are separately sent on resources of different cells, a case in which the first request message still fails to be sent on a resource of the cell in which the resource for sending the first MAC-CE is located due to a quality/link problem of the cell can be avoided.

In a possible implementation, in the case 3 or the case 4, when a quantity of transmissions of the second request message reaches a preset value, and the first response message shown in the case 2 or a second response message is still not received, the terminal device determines that the link recovery fails.

In another possible implementation, in the case 3 or the case 4, when a quantity of transmissions of the second request message exceeds a preset value, the terminal device determines that the link recovery fails.

In another possible implementation, in the case 3 or the case 4, when a quantity of transmissions of the second request message is greater than or equal to a preset value, the terminal device sends a third request message by using a PRACH, or the terminal device sends the second request message by using a PRACH.

In another possible implementation, in the case 3 or the case 4, when a quantity of information, sent by the terminal device by using a MAC-CE, about reference signal resources used to recover the cell in which the link failure occurs exceeds a preset threshold, and a quantity of repeated transmissions of a MAC-CE for carrying information about the last reference signal is greater than or equal to a preset value, if the terminal device still does not receive the first response message shown in the case 2 or a second response message, the terminal device determines that the link recovery fails.

In another possible implementation, in the case 3 or the case 4, when a quantity of information, sent by the terminal device by using a MAC-CE, about reference signal resources used to recover the cell in which the link failure occurs exceeds a preset threshold, the terminal device determines that the link recovery fails.

In another possible implementation, in the case 3 or the case 4, when a quantity of information, sent by the terminal device by using a MAC-CE, about reference signal resources used to recover the cell in which the link failure occurs exceeds a preset threshold, the terminal device sends a third request message by using a PRACH, or the terminal device sends the second request message by using a PRACH for the possibility 2.

The embodiment shown in FIG. 4A and FIG. 4B mainly describes how to transmit the BFRQ message depending on whether the first timer expires. The following briefly describes, with reference to FIG. 11, a method for determining, depending on whether a second timer expires, whether link failure recovery succeeds or sending a BFRQ message by using a PRACH.

Figure 11:
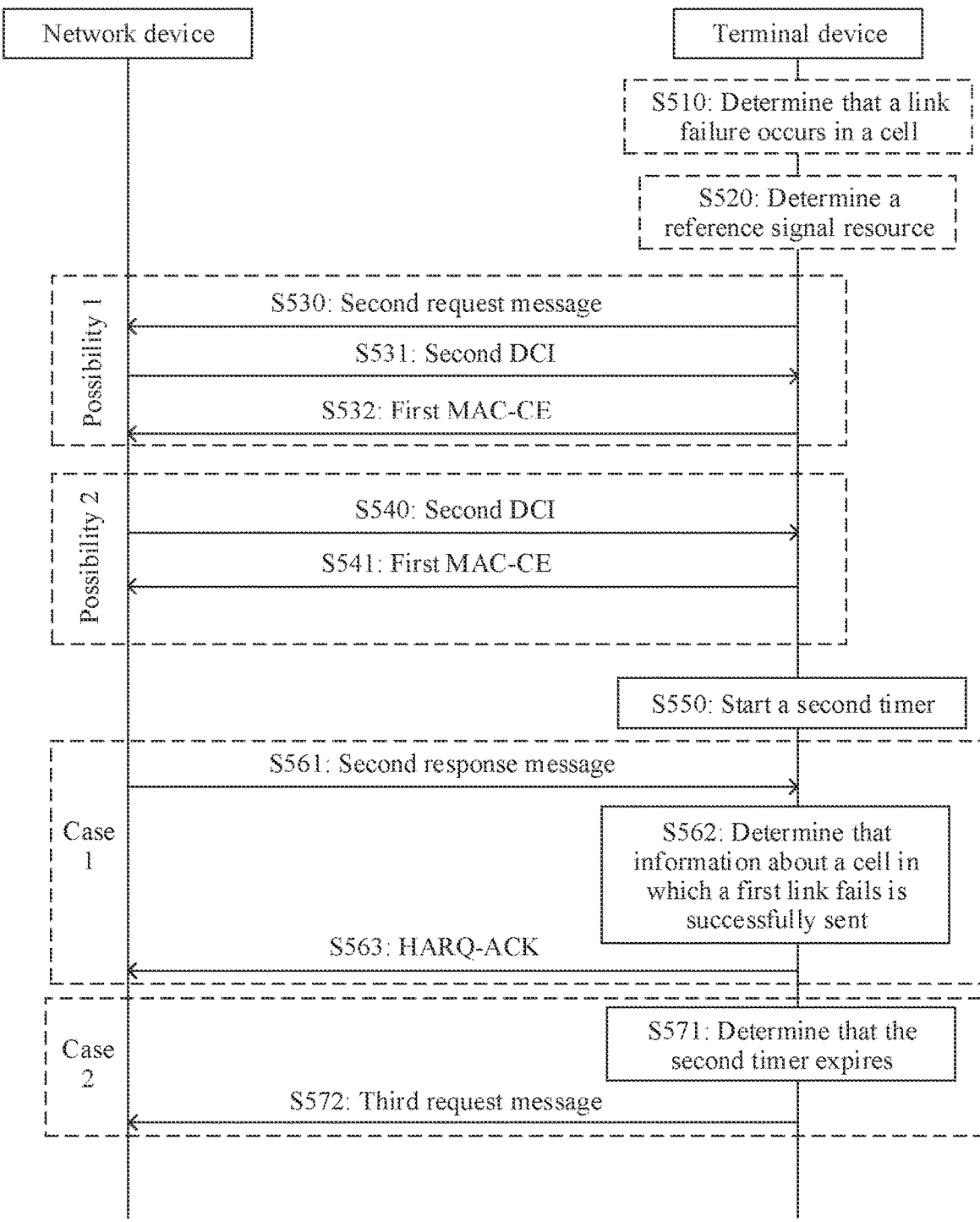
FIG. 11 is a schematic flowchart of another link failure recovery method according to an embodiment of this application.

FIG. 11 is a schematic flowchart of another link failure recovery method according to an embodiment of this application. The flowchart includes a network device and a terminal device.

The link failure recovery method includes the following steps.

S510: The terminal device determines that a link failure occurs in a cell.

This step is similar to S410 in the method procedure shown in FIG. 4A and FIG. 4B, and details are not described herein again.

S520: The terminal device determines a reference signal resource.

This step is similar to S420 in the method procedure shown in FIG. 4A and FIG. 4B, and details are not described herein again.

S530: The terminal device sends a second request message to the network device.

This step is similar to S430 in the method procedure shown in FIG. 4A and FIG. 4B, and details are not described herein again.

S531: The network device sends second DCI to the terminal device.

This step is similar to S431 in the method procedure shown in FIG. 4A and FIG. 4B, and details are not described herein again.

S532: The terminal device sends a first MAC-CE to the network device.

This step is similar to S432 in the method procedure shown in FIG. 4A and FIG. 4B, and details are not described herein again.

S540: The network device sends second DCI to the terminal device.

This step is similar to S440 in the method procedure shown in FIG. 4A and FIG. 4B, and details are not described herein again.

S541: The terminal device sends a first MAC-CE to the network device.

This step is similar to S441 in the method procedure shown in FIG. 4A and FIG. 4B, and details are not described herein again.

It should be noted that, to avoid excessively long link failure recovery time (for example, a link failure recovery delay exceeds an allowed delay range), a second timer is set in this embodiment of this application, and the second timer is used to control link failure recovery time. In this case, the method procedure shown in FIG. 5 further includes S550: The terminal device starts the second timer.

Specifically, the terminal device may start the second timer X time units after the first MAC-CE is sent to the network device; or when the second request message is sent before the first MAC-CE is sent, start the second timer X time units after the second request message is sent, where X is a value greater than or equal to 0, and the second request message is used to indicate the link failure.

In a possible implementation, the terminal device starts the second timer at a moment at which the first MAC-CE is sent.

In another possible implementation, the terminal device starts the second timer after sending the first MAC-CE.

It should be understood that, an occasion on which the terminal device starts the second timer may be after time at which the first MAC-CE is sent, or may be time at which the first MAC-CE is sent, or may be after time at which the second request message is sent, or may be time at which the second request message is sent, or may be after time at which the link failure is determined, or may be time at which the link failure is determined. A specific moment at which the second timer is started is not limited in this application.

Further, after the terminal device starts the second timer, the terminal device detects a second response message within a running period of the second timer. The second response message is used to indicate that the network device successfully receives information about the cell in which the link failure occurs. That the second response message is used to indicate that the network device successfully receives information about the cell in which the link failure occurs may be understood as that the second response message is used to indicate that the information about the cell in which the link failure occurs is successfully transmitted or transmitted successfully.

It should be understood that, the second response message in this embodiment of this application may be a first response message of the first MAC-CE that is sent by the network device to the terminal device after the network device receives the first MAC-CE. Alternatively, when the terminal device sends the first request message to the network device within the running period of the second timer, the second response message may be a response message of the first request message that is sent by the network device to the terminal device after the network device receives the first request message. That is, whether the second response message is a response message of an initially transmitted BFRQ message or a response message of a retransmitted BFRQ message is not limited in this application.

There are the following specific execution cases for the terminal device:

Case 1:

If the terminal device receives, within the running period of the second timer, the second response message sent by the network device, the terminal device stops the second timer, and the terminal device determines that the information about the cell in which the link failure occurs is successfully fed back. That is, the method procedure shown in FIG. 11 further includes: S561: The terminal device receives the second response message. S562: The terminal device determines that the information about the cell in which the link failure occurs is successfully sent. Optionally, the method procedure shown in FIG. 11 further includes: S563: The terminal device sends a HARQ-ACK of the second response message to the network device.

Specifically, the second response message may be any one of the following signaling:

fifth DCI, a physical downlink control channel (PDCCH) transmission configuration indicator (TCI) of the cell in which the link failure occurs, DCI in a dedicated search space set, DCI in a dedicated control resource set, or DCI scrambled by using a dedicated radio network temporary identifier RNTI, where the fifth DCI is used to indicate a downlink resource, or the fifth DCI and sixth DCI (where the sixth DCI indicates a resource, corresponding to the second response message, for initially transmitting the information about the cell in which the link failure occurs) have a same hybrid automatic repeat request process identifier HARQ process identifier and different NDIs.

Case 2:

The terminal device determines that the second timer expires, and the terminal device sends, by using a PRACH, a third request message used for link failure recovery.

That is, the method procedure shown in FIG. 11 further includes: S571: The terminal device determines that the second timer expires. S572: The terminal device sends the third request message.

The third request message may include one or more of the following possibilities:

The third request message is used to indicate the link failure, or the third request information is used to request link recovery of the cell in which the link failure occurs, or the third request information is used to request a resource for carrying the link failure recovery request message, or the like.

The PRACH may be a resource used for link failure recovery of a primary cell or a primary secondary cell. The PRACH may alternatively be a resource used for link failure recovery of a cell in which a resource for carrying the second request message is located.

A difference from the first timer shown in FIG. 4A and FIG. 4B lies that timing duration of the second timer in the method shown in FIG. 11 is used to control duration of entire link failure recovery. To be specific, when the second timer expires, the terminal device determines that the BFRQ message fails to be sent, and an uplink resource for sending the BFRQ message needs to be changed. In addition, the second timer shown in FIG. 11 is not restarted after the BFRQ message is sent by using the PRACH. A process such as retransmission of the MAC-CE used to indicate the information about the cell in which the link failure occurs may be completed within the running period of the second timer.

It should be understood that, the first timer and the second timer shown in FIG. 4A and FIG. 4B and FIG. 11 may coexist. For example, the terminal device may start the first timer and the second timer K time units after the terminal device sends the first MAC-CE to the network device, where K is a value greater than or equal to 0. The first timer is used to control the retransmission of the BFRQ message (the MAC-CE), and the second timer is used to control the duration of the entire link failure recovery.

It should be further understood that, when both the first timer and the second timer are set in a communications system, in a possible implementation, the timing duration of the second timer is longer than timing duration of the first timer.

For example, the first timer and the second timer are started at a moment P, the timing duration of the first timer is L1, the timing duration of the second timer is L2, and L2 is greater than L1.

For another example, the first timer is started at a moment P1, the second timer is started at a moment P2, the timing duration of the first timer is L1, the timing duration of the second timer is L2, and L2 is greater than L1.

For another example, the first timer is started at a moment P1, the second timer is started at a moment P2, the timing duration of the first timer is L1, the timing duration of the second timer is L2, L2 is greater than L1, and P1+L1 is less than or equal to P2+L2.

In another possible implementation, after the first timer and the second timer are started for the first time, a moment at which the second timer expires is later than or equal to a moment at which the first timer expires.

It should be understood that, sequence numbers of the foregoing processes do not mean execution sequences in the foregoing method embodiments. The execution sequences of the processes should be determined based on functions and internal logic of the processes, and should not be construed as any limitation on the implementation processes of the embodiments of this application.

The foregoing describes in detail the link failure recovery method provided in the embodiments of this application with reference to FIG. 4A and FIG. 4B to FIG. 11, and the following describes in detail link failure recovery apparatuses provided in the embodiments of this application with reference to FIG. 12 to FIG. 15.

Figure 12:
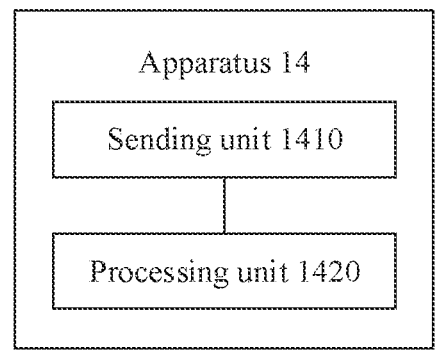
FIG. 12 is a schematic diagram of a link failure recovery apparatus 14 according to this application.

FIG. 12 is a schematic diagram of a link failure recovery apparatus 14 according to this application. As shown in FIG. 12, the apparatus 14 includes a sending unit 1410 and a processing unit 1420.

The sending unit 1410 is configured to send a first media access control-control element MAC-CE, where the first MAC-CE includes information about the cell in which the link failure occurs.

The processing unit 1420 is configured to start a first timer.

The sending unit 1410 is further configured to: send a first request message when the first timer expires, where the first request message is the first MAC-CE, or the first request message is a second MAC-CE, and the second MAC-CE includes information about at least one cell in which a link failure occurs.

The apparatus 14 completely corresponds to the terminal device in the method embodiments. The apparatus 14 may be the terminal device in the method embodiments, or may be a chip or a functional module inside the terminal device in the method embodiments. The corresponding units of the apparatus 14 are configured to perform corresponding steps performed by the terminal device in the method embodiment shown in FIG. 2.

The sending unit 1410 in the apparatus 14 performs the sending step of the terminal device in the method embodiments, for example, performs step S430 of sending the second request message to the network device in FIG. 4A and FIG. 4B; further performs step S432 of sending the first MAC-CE to the network device in FIG. 4A and FIG. 4B; further performs step S441 of sending the first MAC-CE to the network device in FIG. 4A and FIG. 4B; further performs step S463 of sending the first MAC-CE to the network device in FIG. 4A and FIG. 4B; further performs step S473 of sending the HARQ-ACK of the first response message to the network device in FIG. 4A and FIG. 4B; further performs step S482 of sending the second request message to the network device in FIG. 4A and FIG. 4B; further performs step S484 of sending the first request message to the network device in FIG. 4A and FIG. 4B; further performs step S491 of sending the first request message to the network device in FIG. 4A and FIG. 4B; further performs step S530 of sending the second request message to the network device in FIG. 11; further performs step S532 of sending the first MAC-CE to the network device in FIG. 11; further performs step S541 of sending the first MAC-CE to the network device in FIG. 11; further performs step S563 of sending the HARQ-ACK of the first response message to the network device in FIG. 11; and further performs step S572 of sending the third request message to the network device in FIG. 11.

The processing unit 1420 performs steps implemented or processed internally by the terminal device in the method embodiments, for example, performs step S410 of determining that the link failure occurs in the cell in FIG. 4A and FIG. 4B; further performs step S420 of determining the reference signal resource in FIG. 4A and FIG. 4B; further performs step S450 of starting the first timer in FIG. 4A and FIG. 4B; further performs step S462 of determining to resending the first MAC-CE in FIG. 4A and FIG. 4B; further performs step S472 of determining that the first MAC-CE is successfully sent in FIG. 4A and FIG. 4B; further performs step S480 of determining that the first timer expires in FIG. 4A and FIG. 4B; further performs step S510 of determining that the link failure occurs in the cell in FIG. 11; further performs step S520 of determining the reference signal resource in FIG. 11; further performs step S550 of starting the second timer in FIG. 11; further performs step S562 of determining that the information about the cell in which the link failure occurs is successfully sent in FIG. 11; and further performs step S571 of determining that the second timer expires in FIG. 11.

The apparatus 14 may further include a receiving unit, configured to perform the receiving step of the terminal device, for example, receive information sent by another device. The sending unit 1410 and the receiving unit may form a transceiver unit, which has both a receiving function and a sending function. The processing unit 1420 may be a processor. The sending unit 1410 may be a transmitter, and the receiving unit may be a receiver. The receiver and the transmitter may be integrated into a transceiver.

Figure 13:
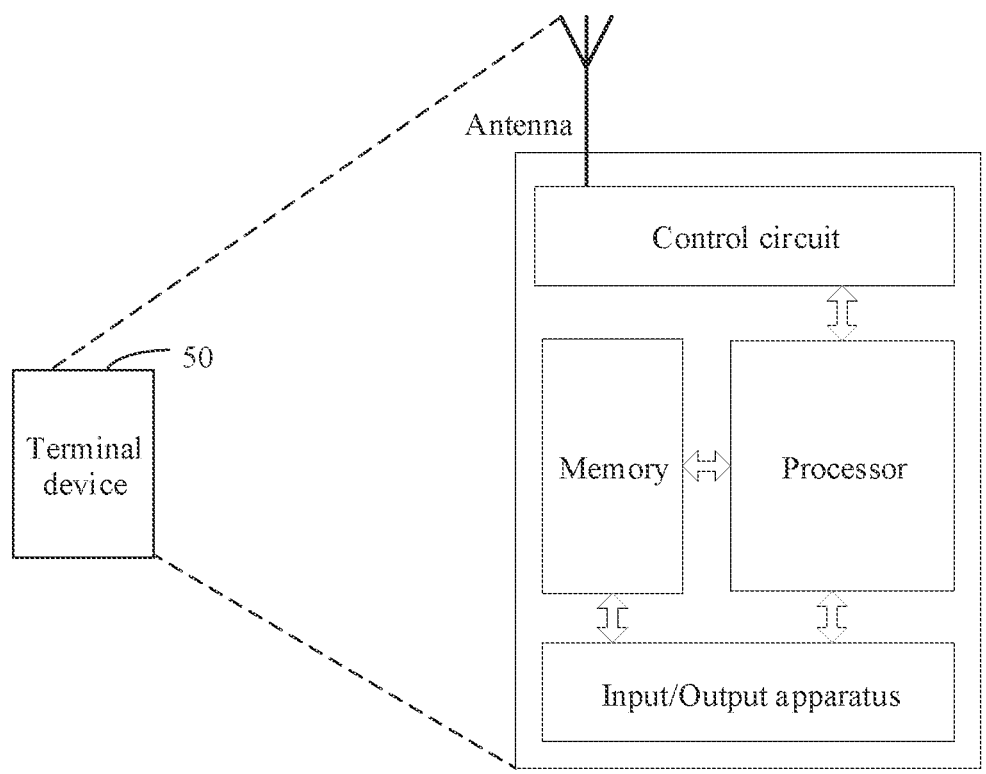
FIG. 13 is a schematic diagram of a structure of a terminal device 50 to which an embodiment of this application is applicable.

FIG. 13 is a schematic diagram of a structure of a terminal device 50 to which an embodiment of this application is applicable. The terminal device 50 may be applied to the system shown in FIG. 1a to FIG. 1c. For ease of description, FIG. 13 shows only main components of the terminal device. As shown in FIG. 13, the terminal device 50 includes a processor (corresponding to the processing unit 1420 shown in FIG. 12), a memory, a control circuit, an antenna, and an input/output apparatus (corresponding to the sending unit 1410 shown in FIG. 12). The processor is configured to control the antenna and the input/output apparatus to send or receive a signal. The memory is configured to store a computer program. The processor is configured to: invoke the computer program from the memory and run the computer program, to perform a corresponding procedure and/or operation performed by the terminal device in the link failure recovery method provided in this application. Details are not described herein again.

A person skilled in the art may understand that, for ease of description, FIG. 13 shows only one memory and one processor. In an actual terminal device, there may be a plurality of processors and a plurality of memories. The memory may also be referred to as a storage medium, a storage device, or the like. This is not limited in this embodiment of this application.

Figure 14:
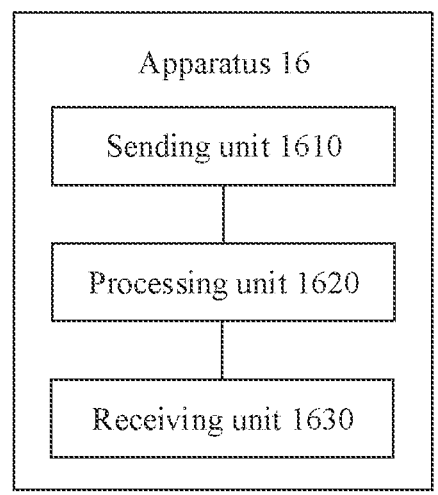
FIG. 14 is a schematic diagram of a link failure recovery apparatus 16 according to this application.

FIG. 14 is a schematic diagram of a link failure recovery apparatus 16 according to this application. As shown in FIG. 14, the apparatus 16 includes a sending unit 1610, a processing unit 1620, and a receiving unit 1630.

The sending unit 1610 is configured to send second downlink control information DCI, where the second DCI is used to indicate a first resource.

The processing unit 1620 is configured to start a first timer.

The receiving unit 1630 is configured to detect a first media access control-control element MAC-CE on the first resource, where the first MAC-CE includes information about the cell in which the link failure occurs.

The sending unit 1610 is further configured to determine, depending on whether the receiving unit receives the first MAC-CE within a running period of the first timer, to send first DCI or a first response message, where the first DCI is used to indicate to resend the first MAC-CE, and the first response message is used to indicate that the first MAC-CE is successfully transmitted.

The apparatus 16 completely corresponds to the network device in the method embodiments. The apparatus 16 may be the network device in the method embodiments, or may be a chip or a functional module inside the network device in the method embodiments. The corresponding units of the apparatus 16 are configured to perform corresponding steps performed by the network device in the method embodiment shown in FIG. 2.

The sending unit 1610 in the apparatus 16 performs the sending step of the network device in the method embodiments, for example, performs step S431 of sending the second DCI to the terminal device in FIG. 4A and FIG. 4B; further performs step S440 of sending the second DCI to the terminal device in FIG. 4A and FIG. 4B; further performs step S461 of sending the first DCI to the terminal device in FIG. 4A and FIG. 4B; further performs step S471 of sending the first response message to the terminal device in FIG. 4A and FIG. 4B; further performs step S483 of sending the third DCI to the terminal device in FIG. 4A and FIG. 4B; further performs step S531 of sending the second DCI to the terminal device in FIG. 11; further performs step S540 of sending the second DCI to the terminal device in FIG. 11; and further performs step S561 of sending the second response message to the terminal device in FIG. 11.

The processing unit 1620 in the apparatus 16 performs steps implemented or processed internally by the network device in the method embodiments, for example, performs step S451 of starting the first timer in FIG. 4A and FIG. 4B; and further performs step S481 of determining that the first timer expires in FIG. 4A and FIG. 4B.

The receiving unit 1630 in the apparatus 16 performs the receiving step of the network device in the method embodiments, for example, performs step S430 of receiving the second request message sent by the terminal device in FIG. 4A and FIG. 4B; further performs step S432 of receiving the first MAC-CE sent by the terminal device in FIG. 4A and FIG. 4B; further performs step S441 of receiving the first MAC-CE sent by the terminal device in FIG. 4A and FIG. 4B; further performs step S463 of receiving the first MAC-CE sent by the terminal device in FIG. 4A and FIG. 4B; further performs step S473 of receiving the HARQ-ACK of the first response message sent by the terminal device in FIG. 4A and FIG. 4B; further performs step S482 of receiving the second request message sent by the terminal device in FIG. 4A and FIG. 4B; further performs step S484 of receiving the first request message sent by the terminal device in FIG. 4A and FIG. 4B; further performs step S491 of receiving the first request message sent by the terminal device in FIG. 4A and FIG. 4B; further performs step S530 of receiving the second request message sent by the terminal device in FIG. 11; further performs step S532 of receiving the first MAC-CE sent by the terminal device in FIG. 11; further performs step S541 of receiving the first MAC-CE sent by the terminal device in FIG. 11; further performs step S563 of receiving the HARQ-ACK of the first response message sent by the terminal device in FIG. 11; and further performs step S572 of receiving the third request message sent by the terminal device in FIG. 11.

The receiving unit 1630 and the sending unit 1610 may form a transceiver unit, which has both a receiving function and a sending function. The processing unit 1620 may be a processor. The sending unit 1610 may be a transmitter. The receiving unit 1630 may be a receiver. The receiver and the transmitter may be integrated into a transceiver.

Figure 15:
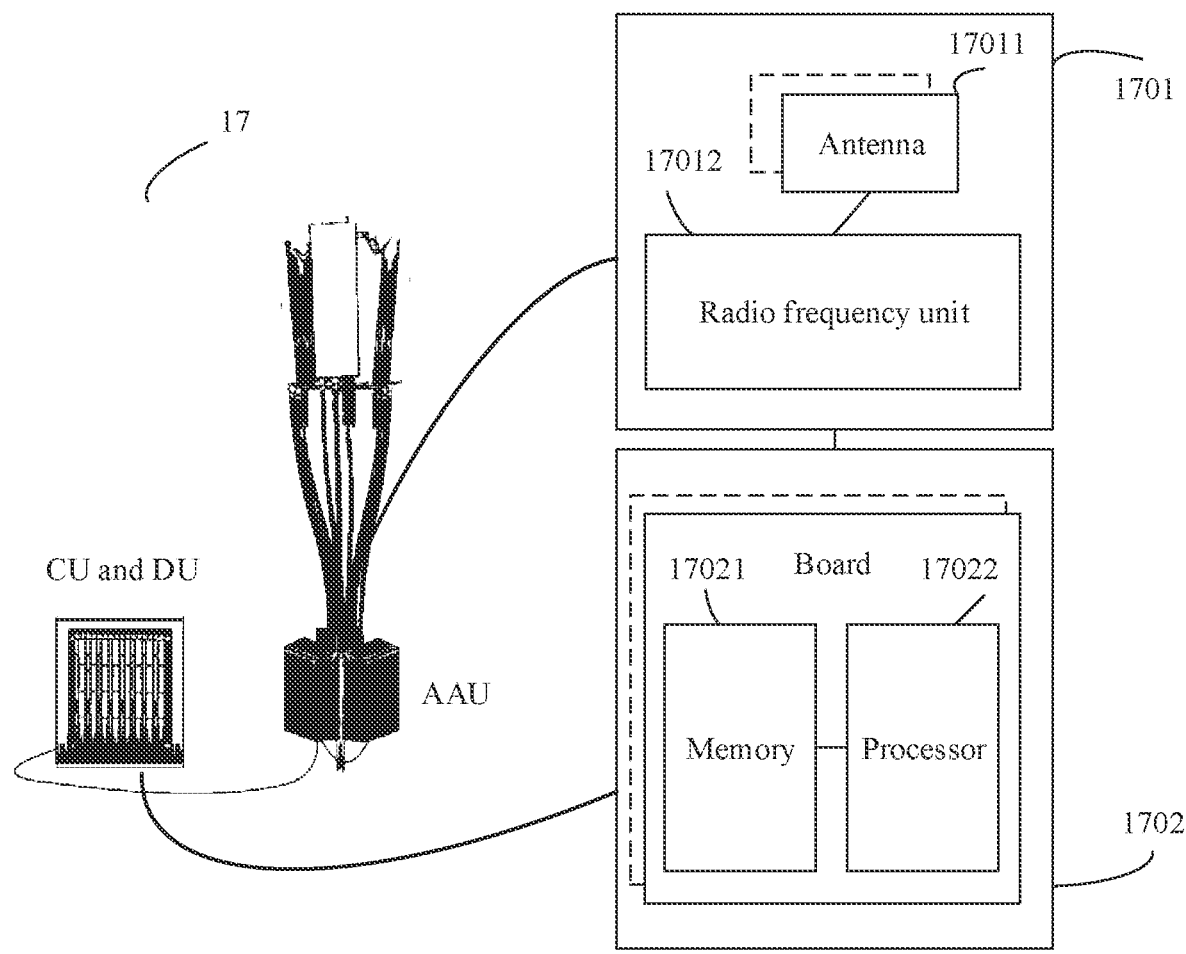
FIG. 15 is a schematic diagram of a structure of a network device 17 to which an embodiment of this application is applicable.

FIG. 15 is a schematic diagram of a structure of a network device 17 to which an embodiment of this application is applicable. The network device 17 may be configured to implement a function of the network device in the link failure recovery method. FIG. 15 may be a schematic diagram of a structure of a network device.

In a 5G communications system, the network device 17 may include a CU, a DU, and an AAU. In comparison with a network device in an LTE communications system, the network device 17 includes one or more radio frequency units, for example, a remote radio unit (RRU) and one or more baseband units (base band units, BBUs).

A non-real-time part of the original BBU is split and redefined as a CU, which is responsible for processing a non-real-time protocol and service. Some physical layer processing functions of the BBU are combined with the original RRU and a passive antenna into an AAU, and the remaining functions of the BBU are redefined as a DU, which is responsible for processing a physical layer protocol and a real-time service. In short, a CU and a DU are distinguished between each other based on real-time performance of processed content, and an AAU is a combination of an RRU and an antenna.

The CU, the DU, and the AAU may be deployed separately or together. Therefore, there may be a plurality of network deployment forms. A possible deployment form is shown in FIG. 15, and is consistent with a conventional 4G network device. The CU and the DU are deployed on same hardware. It should be understood that, FIG. 15 is merely an example, and constitutes no limitation on the protection scope of this application. For example, a deployment form may alternatively be that DUs are deployed in a 5G BBU equipment room, CUs or DUs are deployed together, or CUs are centralized at a higher level.

The AAU may implement a transceiver function, is referred to as a transceiver unit 1701, and corresponds to the sending unit 1610 and the receiving unit 1630 in FIG. 14. Optionally, the transceiver unit 1701 may also be referred to as a transceiver, a transceiver circuit, a transceiver, or the like, and may include at least one antenna 17011 and a radio frequency unit 17012. Optionally, the transceiver unit 1701 may include a receiving unit and a sending unit. The receiving unit may correspond to a receiver (or referred to as a receiver or a receiver circuit), and the sending unit may correspond to a transmitter (or referred to as a transmitter or a transmitter circuit). The CU and the DU may implement an internal processing function, are referred to as a processing unit 1702, and correspond to the processing unit 1620 in FIG. 14. The processing unit 1702 can include a memory 17021 and a processor 17022. Optionally, the processing unit 1702 may control the network device or the like, and may be referred to as a controller. The AAU, the CU, and the DU may be physically disposed together, or may be physically disposed separately.

In addition, the network device is not limited to the form shown in FIG. 15, and may alternatively be in another form. For example, the network device includes a BBU and an adaptive radio unit (ARU), or includes a BBU and an active antenna unit (AAU), or may be customer premises equipment (CPE), or may be in another form. This is not limited in this application.

It should be understood that, the network device 17 shown in FIG. 15 can implement functions related to the network device in the method embodiments in FIG. 4A and FIG. 4B to FIG. 11. Operations and/or functions of the units in the network device 17 are respectively used to implement corresponding procedures performed by the network device in the foregoing method embodiments of this application. To avoid repetition, detailed descriptions are appropriately omitted herein. The structure of the network device shown in FIG. 15 is merely a possible form, but shall not constitute any limitation on this embodiment of this application. In this application, a possibility that there may be a network device structure in another form in the future is not excluded.

An embodiment of this application further provides a communications system, including the foregoing terminal device and network device.

This application further provides a computer-readable storage medium. The computer-readable storage medium stores instructions. When the instructions are run on a computer, the computer is enabled to perform steps performed by the terminal device in the methods shown in FIG. 4A and FIG. 4B to FIG. 11.

This application further provides a computer-readable storage medium. The computer-readable storage medium stores instructions. When the instructions are run on a computer, the computer is enabled to perform steps performed by the network device in the methods shown in FIG. 4A and FIG. 4B to FIG. 11.

This application further provides a computer program product including instructions. When the computer program product runs on a computer, the computer is enabled to perform steps performed by the terminal device in the methods shown in FIG. 4A and FIG. 4B to FIG. 11.

This application further provides a computer program product including instructions. When the computer program product runs on a computer, the computer is enabled to perform steps performed by the network device in the methods shown in FIG. 4A and FIG. 4B to FIG. 11.

This application further provides a chip, including a processor. The processor is configured to read and run a computer program stored in a memory, to perform corresponding operations and/or procedures performed by the terminal device in the link failure recovery method provided in this application. Optionally, the chip further includes the memory, the memory is connected to the processor through a circuit or a wire, and the processor is configured to read and execute the computer program in the memory. Further, optionally, the chip further includes a communications interface, and the processor is connected to the communications interface. The communications interface is configured to receive data and/or information that need/needs to be processed, and the processor obtains the data and/or the information from the communications interface, and processes the data and/or the information. The communications interface may be an input/output interface, an interface circuit, an output circuit, an input circuit, a pin, a related circuit, or the like on the chip. The processor may alternatively be embodied as a processing circuit or a logic circuit.

This application further provides a chip, including a processor. The processor is configured to read and run a computer program stored in a memory, to perform corresponding operations and/or procedures performed by the network device in the link failure recovery method provided in this application. Optionally, the chip further includes the memory, the memory is connected to the processor through a circuit or a wire, and the processor is configured to read and execute the computer program in the memory. Further, optionally, the chip further includes a communications interface, and the processor is connected to the communications interface. The communications interface is configured to receive data and/or information that need/needs to be processed, and the processor obtains the data and/or the information from the communications interface, and processes the data and/or the information. The communications interface may be an input/output interface, an interface circuit, an output circuit, an input circuit, a pin, a related circuit, or the like on the chip. The processor may alternatively be embodied as a processing circuit or a logic circuit.

It should be understood that, the foregoing chip may alternatively be replaced with a chip system, and details are not described herein.

The terms "first", "second", "third", "fourth", and the like (if any) in this application are intended to distinguish between similar objects but do not necessarily indicate a specific order or sequence. It should be understood that data termed in such a way is interchangeable in proper circumstances, so that the embodiments of this application described herein can be implemented in other orders than the order illustrated or described herein. In addition, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

It should be understood that, the processor mentioned in the embodiments of the present invention may be a central processing unit (CPU), or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor, or the like.

It should be further understood that, the memory mentioned in the embodiments of the present invention may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external buffer. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus random access memory (direct Rambus RAM, DR RAM).

It should be noted that, when the processor is a general-purpose processor, a DSP, an ASIC, an FPGA or another programmable logic device, a discrete gate, a transistor logic device, or a discrete hardware component, the memory (a storage module) is integrated into the processor.

It should be noted that, the memory described in this specification is intended to include but is not limited to these memories and any other appropriate types of memories.

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual coupling or direct coupling or communication connections may be implemented by using some interfaces. The indirect coupling or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

In addition, the term "and/or" in this application describes only an association relationship for describing associated objects and represents that three relationships may exist. For example, A and/or B may indicate the following three cases: Only A exists, both A and B exist, and only B exists. In addition, the character "/" in this specification generally indicates an "or" relationship between the associated objects. The term "at least one" in this application may represent "one" and "two or more". For example, at least one of A, B, and C may indicate the following seven cases: Only A exists, only B exists, only C exists, both A and B exist, both A and C exist, both C and B exist, and A, B, and C exist.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A link failure recovery method, comprising:
    sending a first media access control-control element (MAC-CE), wherein the first MAC-CE comprises information about a cell in which a first link failure occurs;
    starting a first timer;
    detecting first downlink control information (DCI) within a running period of the first timer, wherein the first DCI indicates to resend the first MAC-CE;
    in response to expiration of the first timer, sending a message indicating the first link failure;
    after sending the message, receiving second DCI based on the message, wherein the second DCI indicates a second resource for carrying a first request message; and
    after receiving the second DCI, sending the first request message, wherein the first request message is the first MAC-CE or a second MAC-CE that comprises information about at least one cell in which a link failure occurs.

2. The method according to claim 1, wherein sending the first MAC-CE comprises sending the first MAC-CE on a first resource, wherein sending the first request message comprises sending the first request message on the second resource, and wherein cells in which the first resource and the second resource are located are different.

3. The method according to claim 1, wherein the method further comprises:

detecting a first response message within the running period of the first timer, wherein the first response message indicates that the first MAC-CE is successfully transmitted.

4. The method according to claim 1, wherein the method further comprises:
resending the first MAC-CE in response to receiving the first DCI within the running period of the first timer.

5. The method according to claim 4, wherein the method further comprises:
resetting the first timer K time units after the first MAC-CE is resent, wherein K is a value greater than or equal to 0.

6. The method according to claim 3, wherein the method further comprises:
stopping the first timer in response to receiving the first response message within the running period of the first timer.

7. The method according to claim 1, wherein the message indicating the first link failure is carried on a physical uplink control channel (PUCCH), or the message indicating the first link failure is carried on a physical random access channel (PRACH).

8. The method according to claim 1, further comprising:
starting a second timer; and
in response to expiration of the second timer, sending, on a physical random access channel (PRACH), second request message used for link failure recovery.

9. A link failure recovery apparatus, comprising:
a transceiver;
at least one processor; and
one or more memories coupled to the at least one processor and storing programming instructions for execution by the at least one processor to:
send, by the transceiver, a first media access control-control element (MAC-CE), wherein the first MAC-CE comprises information about a cell in which a first link failure occurs;
start a first timer;
detect first downlink control information (DCI) within a running period of the first timer, wherein the first DCI indicates to resend the first MAC-CE;
in response to expiration of the first timer, sending a message indicating the first link failure;
after sending the message, receiving second DCI based on the message, wherein the second DCI indicates a second resource for carrying a first request message; and
after receiving the second DCI, send, by the transceiver, the first request message, wherein the first request message is the first MAC-CE or a second MAC-CE that comprises information about at least one cell in which a link failure occurs.

10. The apparatus according to claim 9, wherein sending the first MAC-CE comprises sending, by the transceiver, the first MAC-CE on a first resource, wherein sending the first request message comprises sending, by the transceiver, the first request message on the second resource, and wherein cells in which the first resource and the second resource are located are different.

11. The apparatus according to claim 9, wherein the programming instructions are for execution by the at least one processor to:
detect a first response message within the running period of the first timer, wherein the first response message indicates that the first MAC-CE is successfully transmitted.

12. The apparatus according to claim 9, wherein the programming instructions are for execution by the at least one processor to resend, by the transceiver, the first MAC-CE in response to receiving the first DCI within the running period of the first timer.

13. The apparatus according to claim 12, wherein the programming instructions are for execution by the at least one processor to:
reset the first timer K time units after the first MAC-CE is resent, wherein K is a value greater than or equal to 0.

14. The apparatus according to claim 11, wherein the programming instructions are for execution by the at least one processor to stop the first timer in response to receiving the first response message during the running period of the first timer.

15. The apparatus according to claim 9, wherein the message indicating the first link failure is carried on a physical uplink control channel (PUCCH), or the message indicating the first link failure is carried on a physical random access channel (PRACH).

16. A link failure recovery apparatus, comprising:
a transceiver;
at least one processor; and
one or more memories coupled to the at least one processor and storing programming instructions for execution by the at least one processor to:
send second downlink control information (DCI), wherein the second DCI indicates a first resource;
start a first timer;
detect a first media access control-control element (MAC-CE) on the first resource, wherein the first MAC-CE comprises information about a cell in which a first link failure occurs;
determine, depending on whether the apparatus receives the first MAC-CE within a running period of the first timer, whether to send first DCI, wherein the first DCI indicates to resend the first MAC-CE;
receive a message indicating the first link failure; and
after receiving the message, send, by the transceiver, third DCI based on the message when the first timer expires, wherein the third DCI indicates a second resource for carrying a first request message, the first request message is the first MAC-CE or a second MAC-CE that comprises information about at least one cell in which a link failure occurs.

17. The apparatus according to claim 16, wherein the programming instructions are for execution by the at least one processor to:
in response to not receiving the first MAC-CE within the running period of the first timer, send, by the transceiver, the first DCI; and
re-detect, by the transceiver, the first MAC-CE.

18. The apparatus according to claim 17, wherein the programming instructions are for execution by the at least one processor to reset the first timer K time units after the first MAC-CE is re-detected, wherein K is a value greater than or equal to 0.

19. The apparatus according to claim 18, wherein the programming instructions are for execution by the at least one processor to:
determine, depending on whether the apparatus receives the first MAC-CE within a running period of the first timer, whether to send a first response message, wherein the first response message indicates that the first MAC-CE is successfully transmitted;

send, by the transceiver, the first response message in response to receiving the first MAC-CE within the running period of the first timer; or stop the first timer in response to receiving a hybrid automatic repeat request-acknowledgement (HARQ-ACK) of the first response message.

20. The apparatus according to claim 16, wherein the message indicating the first link failure is carried on a physical uplink control channel (PUCCH), or the message indicating the first link failure is carried on a physical random access channel (PRACH).

* * * * *